US012631917B2

(12) United States Patent (10) Patent No.: US 12,631,917 B2

Lee et al. (45) Date of Patent: May 19, 2026

(54) DISPLAY APPARATUS

(71) Applicant: SAMSUNG ELECTRONICS CO., LTD., Suwon-si (KR)

(72) Inventors: Youngmin Lee, Suwon-si (KR); Yonghun Kwon, Suwon-si (KR); Sunyoung Kim, Suwon-si (KR); Jaewoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/082,642

(22) Filed: Mar. 18, 2025

(65) Prior Publication Data

US 2025/0216720 A1 Jul. 3, 2025

Related U.S. Application Data

(63) Continuation of application No. PCT/KR2023/011635, filed on Aug. 8, 2023.

(30) Foreign Application Priority Data

Sep. 30, 2022 (KR) ........................ 10-2022-0125840

(51) Int. Cl.
G02F 1/13357 (2006.01)

(52) U.S. Cl.
CPC .. G02F 1/133608 (2013.01); G02F 1/133603 (2013.01); *G02F 2201/505* (2013.01)

(58) Field of Classification Search
CPC ......... G02F 1/133608; G02F 1/133603; G02F 2201/505; G02F 1/1333; G02F 1/1335; (Continued)

(56) References Cited

U.S. PATENT DOCUMENTS

| 8,233,111 B2 | 7/2012 | Moon et al. |
| 11,340,650 B2 | 5/2022 | Kim et al. |
| (Continued) | | |

FOREIGN PATENT DOCUMENTS

| JP | 2002 232009 A | 8/2002 |
| JP | 2007 335371 A | 12/2007 |
| (Continued) | | |

OTHER PUBLICATIONS

English translation of Kentaro JP-2011128637-A (Year: 2011).*

(Continued)

*Primary Examiner* — Evan P Dzierzynski
(74) *Attorney, Agent, or Firm* — Sughrue Mion, PLLC

(57) ABSTRACT

A display apparatus includes: a display panel; a rear chassis configured to support the display panel; and a light source module positioned on the rear chassis. The light source module includes: a light source configured to emit light periodically by power of a power source periodically applied so as to adjust an intensity of the light, a light source board electrically connectable with the light source, the light source board configured to be periodically moved at least partially closer to the rear chassis based on the power of the power source periodically applied to the light source, and a sound-absorbing layer positioned on the light source board so as to reduce noise caused by the light source board and the rear chassis.

15 Claims, 30 Drawing Sheets

(58) Field of Classification Search
CPC ............. G02F 1/1336; G02F 1/133314; G02F
1/133602; G02F 1/133612
See application file for complete search history.

(56) References Cited

U.S. PATENT DOCUMENTS

| | | | | |
|---|---|---|---|---|
| 2004/0263505 | A1 * | 12/2004 | Tsubokura | .......... G02F 1/13452 |
| | | | | 345/204 |
| 2007/0008620 | A1 | 1/2007 | Shestak et al. | |
| 2008/0186425 | A1 * | 8/2008 | Chang | ............... G02F 1/133608 |
| | | | | 362/633 |
| 2012/0044668 | A1 * | 2/2012 | Takeuchi | .......... G02F 1/133603 |
| | | | | 361/759 |
| 2012/0200785 | A1 | 8/2012 | Ohki | |
| 2016/0259207 | A1 | 9/2016 | Matsuo | |
| 2019/0361310 | A1 * | 11/2019 | Kim | ....................... H04R 7/045 |
| 2021/0240039 | A1 * | 8/2021 | Kim | .................. G02F 1/133628 |
| 2022/0070563 | A1 * | 3/2022 | Kim | ....................... H04R 1/026 |

FOREIGN PATENT DOCUMENTS

| | | | | | |
|---|---|---|---|---|---|
| JP | 2011 108638 | A | | 6/2011 | |
| JP | 2011128637 | A | * | 6/2011 | |
| JP | 4746692 | B2 | | 8/2011 | |
| JP | 2011 198620 | A | | 10/2011 | |
| KR | 10 2007 0047411 | A | | 5/2007 | |
| KR | 10 0727947 | B1 | | 6/2007 | |
| KR | 10 2007 0118514 | A | | 12/2007 | |
| KR | 10 2010 0071892 | A | | 6/2010 | |
| KR | 20100071892 | A | * | 6/2010 | .......... G02F 1/1336 |
| KR | 10 1051924 | B1 | | 7/2011 | |
| KR | 10 2012 0074070 | A | | 7/2012 | |
| KR | 10 2013 0043838 | A | | 5/2013 | |
| KR | 10 2016 0057106 | A | | 5/2016 | |
| KR | 10 2017 0117701 | A | | 10/2017 | |
| KR | 10 2021 0006111 | A | | 1/2021 | |

OTHER PUBLICATIONS

English translation of Park KR-20100071892 (Year: 2010).*
International Search Report dated Nov. 29, 2023, issued by the International Searching Authority in International Application No. PCT/KR2023/011635.
Written Opinion dated Nov. 29, 2023, issued by the International Searching Authority in International Application No. PCT/KR2023/011635.

* cited by examiner

DISPLAY APPARATUS

CROSS-REFERENCE TO RELATED APPLICATIONS

This application is a continuation application of International Application No. PCT/KR2023/011635 filed on Aug. 8, 2023, which claims priority to Korean Patent Application No. 10-2022-0125840, filed on Sep. 30, 2022, in the Korean Intellectual Property Office, the disclosures of which are incorporated by reference herein in their entireties.

FIELD

The present disclosure relates to a display apparatus, and more particularly to a display apparatus including a backlight unit.

BACKGROUND

A display apparatus is a type of output device that visually displays data information such as texts, shapes, and images and the like to a user.

The display apparatus may include a self-emissive display panel, such as an organic light-emitting diode (OLED), or a non-emissive display panel, such as a liquid crystal display (LCD).

The display apparatus may include a backlight unit capable of emitting light and a rear chassis supporting the backlight unit.

The backlight unit may be at least partially attached to the rear chassis for mounting. The backlight unit may be movable. Accordingly, a portion of the backlight unit that is not attached to the rear chassis may generate a friction noise with the rear chassis.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

According to an aspect of an embodiment, a display apparatus may include a display panel; a rear chassis configured to support the display panel; and a light source module positioned on the rear chassis, wherein the light source module comprises: a light source configured to emit light periodically by power of a power source periodically applied so as to adjust the intensity of the light, a light source board electrically connectable with the light source, the light source board being enabled to be periodically moved at least partially closer to the rear chassis based on the power of the power source periodically applied to the light source, and a sound-absorbing layer positioned on the light source board so as to reduce noise caused by the light source board and the rear chassis.

The sound-absorbing layer may be positioned between the light source board and the rear chassis.

The sound-absorbing layer may be configured to be attached to the light source board.

The light source board may include a plurality of coupling portions configured to be coupled with the rear chassis, and a vibrating portion arranged between the plurality of coupling portions to allow a distance from the rear chassis to be variable.

The light source board may extend in a longitudinal direction, and the plurality of coupling portions may be arranged in the longitudinal direction.

A length of the light source board may be 200 times or more than a thickness of the light source board.

The light source module may comprise a light emitter configured to convert a wavelength of light emitted from the light source into a plurality of different wavelengths, and the sound-absorbing layer comprises a first material and the light emitter comprises a second material, wherein the first and the second materials are same.

The sound-absorbing layer may be configured to cover a portion of a surface of the light source board facing the rear chassis.

The periodically applied power may have a frequency of 500 Hz or higher.

The coupling portion of the light source board may include a coupling hole, the rear chassis may include a coupling protrusion configured to penetrate the coupling hole and couple the rear chassis and the light source board, and the sound-absorbing layer may be coupled to the vibrating portion of the light source board to prevent shielding of the coupling hole.

The rear chassis may include a metallic material, and the light source board comprises a metallic material so as to generate metal friction noise in response to contact with the rear chassis.

The sound-absorbing layer may include an epoxy material.

The sound-absorbing layer may have a thickness of 50 m or less.

The display apparatus may further include a power board configured to periodically turn on or off the power applied to the light source.

The sound-absorbing layer may be attached to the light source board by a silkscreen printing method.

According to various embodiments of the present disclosure, the display apparatus may include the sound-absorbing layer positioned between the board positioned to face the rear chassis of the backlight unit and the rear chassis, thereby reducing the generation of friction noise between the backlight unit and the rear chassis.

According to various embodiments of the present disclosure, the display apparatus may include the sound-absorbing layer produced by a configuration for producing the light emitter that may be included in the backlight unit, so that the increase in the production time of the backlight unit may be small although the configuration that prevents friction noise between the board and the rear chassis having the backlight unit is further produced.

According to various embodiments of the present disclosure, the display apparatus may include the sound-absorbing layer arranged integrally with the board, so that the increase in assembly time of the backlight unit and the rear chassis may be small, although though the configuration for preventing friction noise between the board and the rear chassis having the backlight unit is further produced.

The effects to be obtained from the present disclosure are not limited to those mentioned above, and other effects not mentioned will be apparent to a person skilled in the art to which the present disclosure belongs from the following description.

BRIEF DESCRIPTION OF DRAWINGS

The above and other aspects, features, and advantages of certain embodiments of the present disclosure may be more apparent from the following description taken in conjunction with the accompanying drawings, in which.

DETAILED DESCRIPTION

Figure 1:
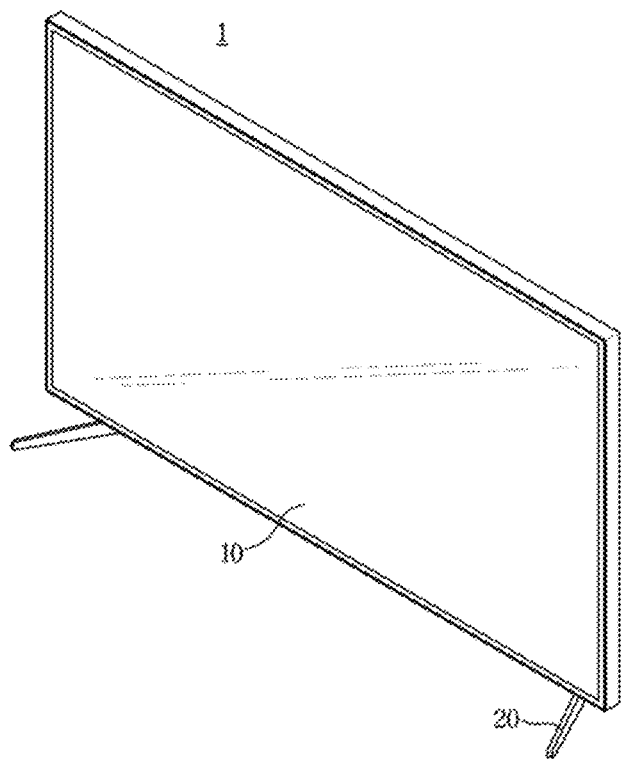
FIG. 1 is a perspective view of a display apparatus according to an embodiment of the present disclosure.

The following description with reference to the accompanying drawings is provided to assist in a comprehensive understanding of embodiments of the present disclosure defined by the claims and their equivalents. Various specific details are included to assist in understanding, but these details are considered to be exemplary only. Therefore, those of ordinary skill in the art may recognize that various changes and modifications of the embodiments described herein may be made without departing from the scope and spirit of the disclosure. In addition, descriptions of well-known functions and structures are omitted for clarity and conciseness.

A display apparatus according to an embodiment of the present disclosure includes a display panel, a rear chassis configured to support the display panel, a light source board enabled to be periodically moved at least partially closer to the rear chassis in response to a magnetic field generated by a periodically applied power source, and a sound-absorbing layer configured so as to reduce noise caused by the light source board and the rear chassis.

The sound-absorbing layer may be positioned between the light source board and the rear chassis to prevent the light source from contacting the rear chassis.

The display apparatus may further include a light source configured to emit light periodically by a power source periodically applied to adjust the intensity of the light, wherein a plurality of light sources is mounted to one side of the light source board, the light source board includes a first portion to which the plurality of light sources is attached and a second portion positioned between the plurality of light sources, and the sound-absorbing layer is attached to the second portion.

The sound-absorbing layer may be provided in a plurality, and the plurality of sound-absorbing layers may be patterned and attached to the light source board.

A display apparatus according to an embodiment of the present disclosure includes a display panel, a rear chassis configured to support the display panel, a light source module positioned on the rear chassis, a sound-absorbing layer positioned between the light source module and the rear chassis to reduce noise caused by the light source board and the rear chassis, wherein the light source module includes a light source configured to emit light periodically by a power source periodically applied to adjust the intensity of the light, a light source board electrically connectable with the light source, the light source board enabled to be periodically moved at least partially closer to the rear chassis by a power source periodically applied to the light source, and a light emitter capable of converting the wavelength of light emitted from the light source into a plurality of different wavelengths, wherein the sound-absorbing layer is configured to include the same material as the light emitter so as to be produced by a process of forming the light emitter.

An aspect of the present disclosure provides a display apparatus in which the generation of friction noise between a backlight unit and a rear chassis is reduced.

An aspect of the present disclosure provides a display apparatus in which an increase in production time of a backlight unit is small, even when a configuration that prevents friction noise between a board having a backlight unit and a rear chassis is further produced.

An aspect of the present disclosure provides a display apparatus in which an increase in assembly time of a backlight unit and a rear chassis is reduced, even when a configuration that prevents friction noise between a board and the rear chassis having the backlight unit is further produced.

Technical tasks to be achieved in this document are not limited to the technical tasks mentioned above, and other technical tasks not mentioned will be clearly understood by those skilled in the art from the description below.

In describing of the drawings, similar reference numerals may be used for similar or related elements.

The singular form of a noun corresponding to an item may include one or more of the items unless clearly indicated otherwise in a related context.

In the disclosure, phrases, such as "A or B", "at least one of A and B", "at least one of A or B", "A, B or C", "at least one of A, B and C", and "at least one of A, B, or C" may include any one or all possible combinations of the items listed together in the corresponding phrase among the phrases.

As used herein, the term "and/or" includes any and all combinations of one or more of the associated listed items.

Terms such as "1st", "2nd", "primary", or "secondary" may be used simply to distinguish an element from other elements, without limiting the element in other aspects (e.g., importance or order).

When an element (e.g., a first element) is referred to as being "(functionally or communicatively) coupled" or "connected" to another element (e.g., a second element), the first element may be connected to the second element, directly (e.g., wired), wirelessly, or through a third element.

It will be understood that when the terms "includes", "comprises", "including", and/or "comprising" are used in the disclosure, they specify the presence of the specified features, figures, steps, operations, components, members, or combinations thereof, but do not preclude the presence or addition of one or more other features, figures, steps, operations, components, members, or combinations thereof.

When a given element is referred to as being "connected to", "coupled to", "supported by" or "in contact with" another element, it is to be understood that it may be directly or indirectly connected to, coupled to, supported by, or in contact with the other element. When a given element is indirectly connected to, coupled to, supported by, or in contact with another element, it is to be understood that it may be connected to, coupled to, supported by, or in contact with the other element through a third element.

It will also be understood that when an element is referred to as being "on" another element, it may be directly on the other element or intervening elements may also be present.

As used herein, the terms "front", "rear", "upper", "lower", "left", "right", and the like are defined with reference to the drawings and are not intended to limit the shape and location of each element.

Specifically, as shown in FIG. 1, a direction in which a display panel 10 is facing may be defined as front, and based on this, rear, left and right, and upper and lower may be defined.

Hereinafter, various embodiments of the present disclosure will be described in detail with reference to the accompanying drawings.

Figure 2:
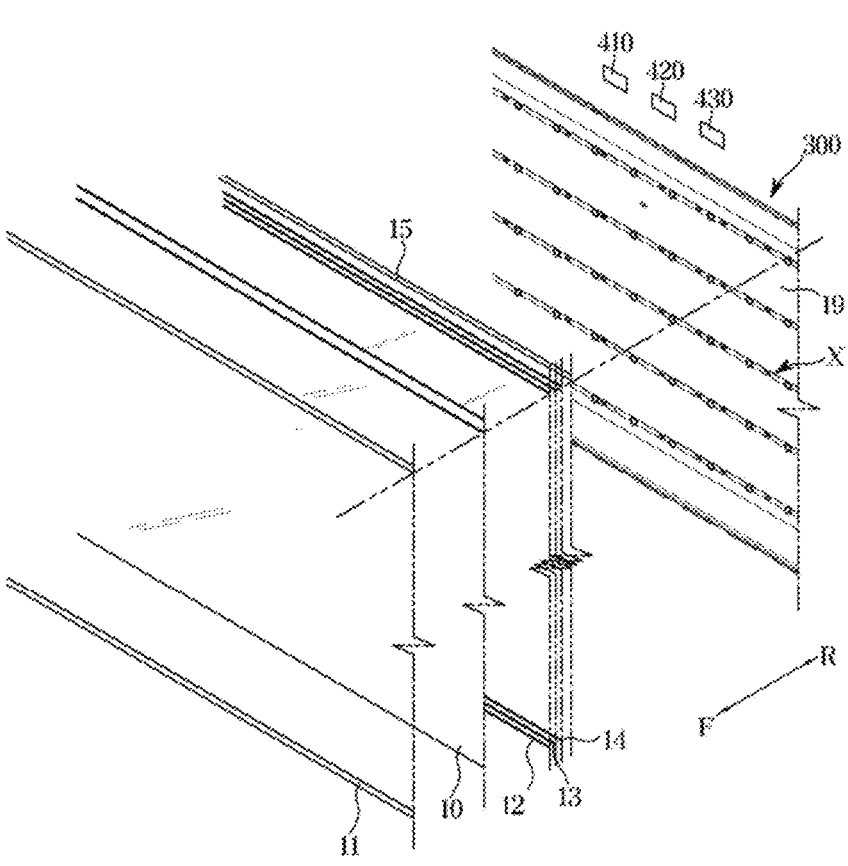
FIG. 2 is an exploded view of a portion of the display apparatus shown in FIG. 1.

FIG. 1 is a perspective view of a display apparatus 1 according to an embodiment of the present disclosure. FIG. 2 is an exploded view of a portion of the display apparatus 1 shown in FIG. 1.

The display apparatus 1 may typically refer to a device that displays an image, such as a photo, video and the like. The display apparatus 1 may include a television, a monitor, and the like. In the following, a television will be described as an example of the display apparatus 1. The television may include a flat television, a curved television, a bendable television, and the like, and the following description will focus on a flat television as an example of the television.

FIG. 1 is a perspective view schematically showing the display apparatus according to an embodiment of the present disclosure, and FIG. 2 is an exploded perspective view of a display module applied to the display apparatus according to an embodiment of the present disclosure.

Referring to FIG. 1, the display apparatus 1 may include a display module that displays a screen.

As shown in FIG. 1 and FIG. 2, the display apparatus 1 may include a display module for displaying an image. The display module may have at least one of a flat shape and a curved shape depending on the type of the display apparatus 1. In other words, based on the display apparatus 1 being a flat television as shown in FIG. 1, the display module may have a flat shape. Based on the display apparatus 1 being a curved television, the display module may have a curved shape. Based on the display apparatus 1 being a variable television, the display module may be transformable into a flat shape and a curved shape.

The display apparatus 1 may further include a rear cover configured to receive the display module and various electrical components.

The rear cover may be configured to enclose the display module from a rear side of the display module. The rear cover may include a stand 20 to allow the display apparatus 1 to be installed in an upright position.

In addition, the display apparatus 1 may be mounted to a wall using a wall mounting bracket instead of the stand 20. In this case, the wall mounting bracket may be detachably mounted from the rear cover.

On an inside of the rear cover, a power board 410 configured to supply power to the display apparatus 1, a signal processing board 420 configured to process various image and sound signals, a timing control board 430 configured to transmit image signals to the display panel 10, and the like may be arranged.

The power board 410 may supply power to a backlight module or a light source 110. The method by which the power board 410 supplies power will be described later.

As shown in FIG. 2, the display module may include the display panel 10 including a liquid crystal panel.

The display module may further include a backlight unit X arranged on a rear side of the display panel 10 to provide light to the display panel 10. The backlight unit X may include a light source print circuit board 200 (hereinafter, referred to as the light source board) also and a plurality of light sources 110.

The light source board 200 may be coupled to a rear chassis 300. The light source board 200 may be detachably coupled to the rear chassis 300. The light source board 200 may be slidably coupled to the rear chassis 300. The light source board 200 may be coupled to the rear chassis 300 such that the plurality of light sources 110 face the display panel 10. The light source board 200 may be formed in the shape of a bar extending in a longitudinal direction of the rear chassis 300 and may be spaced apart from each other in a vertical direction on the rear chassis 300.

The plurality of light sources 110 may be installed on the light source board 200 to provide light to the display panel 10. The plurality of light sources 110 may be installed to be spaced apart from each other along a longitudinal direction of the light source board 200. The plurality of light sources 110 may include light-emitting diodes (LEDs) that generate light. Further description of the light source board 200 will be described later.

The display module may further include a front chassis 11 configured to cover an edge of the display panel 10 and coupled to a front side of the rear chassis 300.

The rear chassis 300 may be configured to cover the rear side of the display panel 10. The backlight unit X and a reflective sheet 19 may be coupled to the rear chassis 300. Further description of the rear chassis 300 will be described later.

The display module may further include a diffuser sheet 12. The diffuser sheet 12 may be formed in the shape of a flat sheet. The diffuser sheet 12 may be arranged between the display panel 10 and the backlight unit X to diffuse the light supplied from the backlight unit X.

A prism sheet 13 and a color conversion sheet 14 may be positioned at the rear of the diffuser sheet 12.

The color conversion sheet 14 may be a sheet capable of changing the wavelength of the light emitted from the light source 110. The light emitted from the light source 110 may be blue. The color conversion sheet 14 may change the wavelength of the light emitted from the light source 110. For example, the light emitted from the light source 110 may be changed to wavelengths corresponding to red, blue, and green. Accordingly, the light passing through the color conversion sheet 14 may be white, which is a combination of red, blue, and green light.

The prism sheet 13 may be positioned in front of the color conversion sheet 14. The prism sheet 13 may function to focus light. In particular, the light passing through the color conversion sheet 14 may be concentrated as it passes through the prism sheet 13.

The internal structure of the display module described above is merely by way of an example, and the order of arrangement of the plurality of sheets may be varied.

Figure 3:
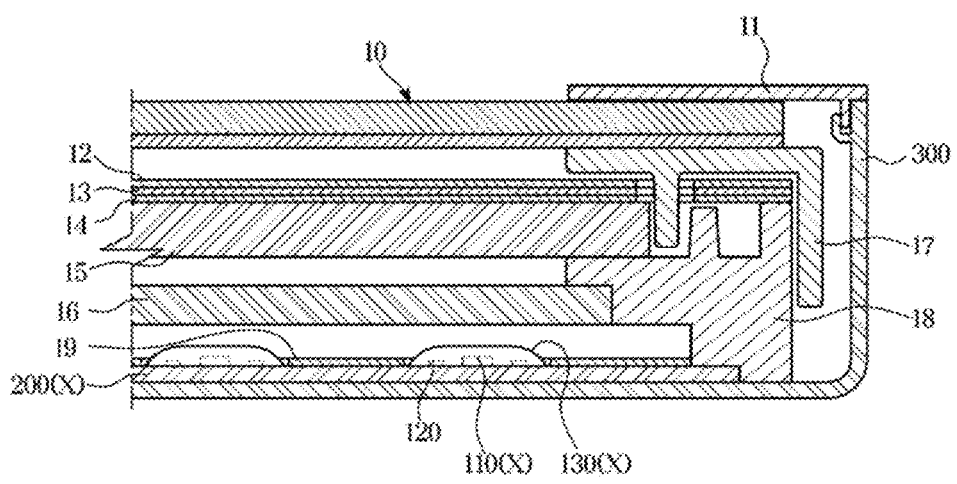
FIG. 3 is a cross-sectional view of the display apparatus shown in FIG. 1.

FIG. 3 is a cross-sectional view of the display apparatus 1 shown in FIG. 1.

With reference to FIG. 3, the display apparatus 1 according to an embodiment of the present disclosure will be described in more detail.

The display apparatus 1 may include the rear chassis 300, the light source board 200, a light source module 100, the reflective sheet 19, a light guide plate 16, a middle holder 18, a diffuser plate 15, an optical sheet, a middle frame 17, the display panel 10, and the front chassis 11.

The light source module 100, the reflective sheet 19, the light guide plate 16, the diffuser plate 15, and the optical sheet may be collectively referred to as a backlight unit. The light source board 200, the light source module 100, the reflective sheet 19, the light guide plate 16, the diffuser plate 15, and the optical sheet may be collectively referred to as a backlight unit. In addition, configurations without the rear chassis 300, the middle holder 18, the middle frame 17, the display panel 10, and the front chassis 11 may be referred to as a backlight unit.

The rear chassis 300 may support the light source board 200 at the rear side of the light source board 200 on which the light source module 100 is mounted. The rear chassis 300 may accommodate the light source board 200 as well as other configurations (e.g., the reflective sheet 19, the light guide plate 16, the middle holder 18, the diffuser plate 15, the optical sheet, the middle frame 17, and the like).

The rear chassis 300 may be configured to support the display panel 10.

The rear chassis 300 may be formed into a high-strength polygonal plate shape, and may include a metallic material (e.g., aluminum, or an aluminum alloy, etc.) that is less susceptible to thermal deformation caused by the heat generated by the received light source modules 100 and/or the display panel 10. The metallic material may include light metals having a specific gravity of 4 or less, and may include non-ferrous metals, excluding iron and alloys based on iron.

The rear chassis 300 may be formed from a plastic (e.g., polycarbonate (PC)) material or a plastic material by adding glass fibers.

The light source board 200 may include a plurality of light source modules 100 mounted thereon. The light source board 200 may include a lens 130 that diffuses light emitted from the plurality of light source modules 100. In addition, in an embodiment of the present disclosure, the light source module 100 may include the lens 130.

The size of the light source board 200 may correspond to the size of the display panel 10. In addition, the light source board 200 may include a set (e.g., consisting of a plurality of arrays) of the plurality of light source modules 100, the lenses 130 corresponding to the plurality of light source modules 100, and light source bars.

The light source bars may be arranged in parallel and spaced apart from each other on a rear surface (e.g., bottom) of the rear chassis 300 (e.g., direct type), or may be arranged on opposite sides (e.g., upper/lower surfaces or left/right surfaces) of the rear chassis 300 (e.g., edge type). A plurality of light source module bars may be arranged on one side (e.g., one of the upper/lower sides or one of the left/right sides) of the rear chassis 300. In some embodiments, the plurality of light source module bars may be arranged on all sides (e.g., upper/lower/left/right sides) of the rear chassis 300.

The light source board 200 may be electrically connected to a power supply that provides power to the display apparatus 1. The set of light source modules bars may be electrically connected to each other.

The light source module 100 may be positioned on the rear chassis 300.

The light source module 100 may be mounted on the light source board 200 and may be supported on the bottom of the rear chassis 300 or on a side of the rear chassis 300. The light source module 100 may emit light by the supplied power. The light source module 100 may emit light onto the display panel 10 located in the front (e.g., +y direction) and act as a backlight in the display apparatus 1. The light source module 100 may include an LED or a cold cathode fluorescent lamp CCFL.

In response to the light source module bar being positioned on at least one side surface of the rear chassis 300, the light guide plate 16 may uniformly guide the light emitted from the light source module 100 to the display panel 10. The light guide plate 16 may be made of a transparent plastic material.

When the display panel 10 of the display apparatus 1 is an organic LED, the light source module 100 may be omitted.

The reflective sheet 19 may direct light emitted from the light source module 100 toward the light guide plate 16 or light reflected from the light guide plate 16 back to the light guide plate 16. The reflective sheet 19 may be arranged on an upper portion of the light source module 100 and/or the light source board 200, and configured to reflect leakage light toward the display panel 10 to improve light efficiency. The reflective sheet 19 may be coated with a white or silver highly reflective coating agent (e.g., silver, TiO₂).

The light guide plate 16 may uniformly distribute the light emitted from the light source module 100 in the direction of the diffuser plate 15. The light guide plate 16 may be made of acrylic material or polycarbonate material. The light guide plate 16 may be omitted depending on the arrangement of the light source module bar (e.g., direct type or edge type).

The middle holder 18 may support the diffuser plate 15 and/or the optical sheet using a plurality of middle holder protrusions. The middle holder 18 may be received in a plurality of corners (e.g., four corners or three or fewer corners) of the rear chassis 300. The light emitted from the light source module 100 may be incident on the diffuser plate 15 and/or the optical sheet without interference from the middle holder 18.

The middle holder 18 may support the reflective sheet 19 extending from the light source board 200.

The diffuser plate 15 may uniformly diffuse the light emitted from the light source module 100 located below the diffuser plate 15. In addition, the diffuser plate 15 may support the optical sheet located above the diffuser plate 15. The diffuser plate 15 may uniformly diffuse the light incident from the light source module 100 and project the light onto the optical sheet. The diffuser plate 15 may be a transparent material or an opaque material. The diffuser plate 15 may include an acrylic material, a urethane material, an epoxy material, a polyester material, a polyamide material, a polystyrene material, or a polycarbonate material.

The optical sheet may cause the light emitted from the light source module 100 and passing through the diffuser plate 15 to have a uniform luminance. The light of uniform luminance passing through the optical sheet may be incident on the display panel 10.

The optical sheet may include a plurality of sheets overlapped by the middle holder protrusion. The optical sheet may have an optical sheet protrusion corresponding to the middle holder protrusion. The optical sheet may include a protective sheet, the prism sheet 13 or the diffuser sheet 12. The optical sheet may include one, two, or four or more layers, as well as three layers.

The reflective sheet 19, the light guide plate 16, the diffuser plate 15, and/or the optical sheet may be referred to as an optical member. The optical member may exclude at least one of the reflective sheet 19, the light guide plate 16, the diffuser plate 15, and the optical sheet.

The middle frame 17 may be located below the display panel 10 and support the display panel 10. In addition, the middle frame 17 may distance the display panel 10, which is located above the middle frame 17, from the optical sheet, which is located below the middle frame 17.

The middle frame 17 may include a middle frame protrusion to support the optical sheet. In addition, the middle frame 17 may support the optical sheet together with the middle frame protrusion and the middle holder protrusion of the middle holder 18.

The middle frame 17 may include acrylonitrile-butadiene-styrene (ABS) resin and/or glass fiber material. In addition, the middle frame 17 may include various plastic, resin, and/or metallic materials.

The display panel 10 may include one or more substrates on which a thin film transistor (TFT) is formed and a liquid crystal display (LCD). The display panel 10 may include a substrate and active matrix organic light emitting diodes (AMOLEDs). In addition, the display panel 10 may include a substrate and OLEDs. It should be understood by those skilled in the art that the display panel 10 is not limited to the methods described above.

The display panel 10 may include a polarizing plate and/or a color filter in contact with the substrate.

A printed circuit board that generates a drive signal to drive the display panel 10 may be located on one side of the display panel 10.

The display panel 10 and the printed circuit board may be electrically connected via a chip-on-film. The chip-on-film may electrically connect the display panel 10 and the printed circuit board supported within the rear chassis 300.

The display panel 10, the chip-on-film, and the printed circuit board may be interconnected in the direction of gravity (e.g. –z direction). The middle frame 17 may be positioned below the display panel 10.

The front chassis 11 may be coupled with the rear chassis 300 that accommodates the configurations of the display apparatus 1. The front chassis 11 may be arranged on the front of the display apparatus 1 and may protect the configurations accommodated therein from external impacts and prevent external leakage (e.g., light loss) of light emitted from the internal light source module 100.

The front chassis 11 may be formed along the perimeter of the display panel 10. The front chassis 11 may have a cross-sectional shape (e.g. 'L' or 'C') that may cover an upper surface and side edges of the display panel 10. The front chassis 11 may include an opening. The front surface of the four corners, excluding the opening of the front chassis 11, may be referred to as a "bezel".

Figure 4:
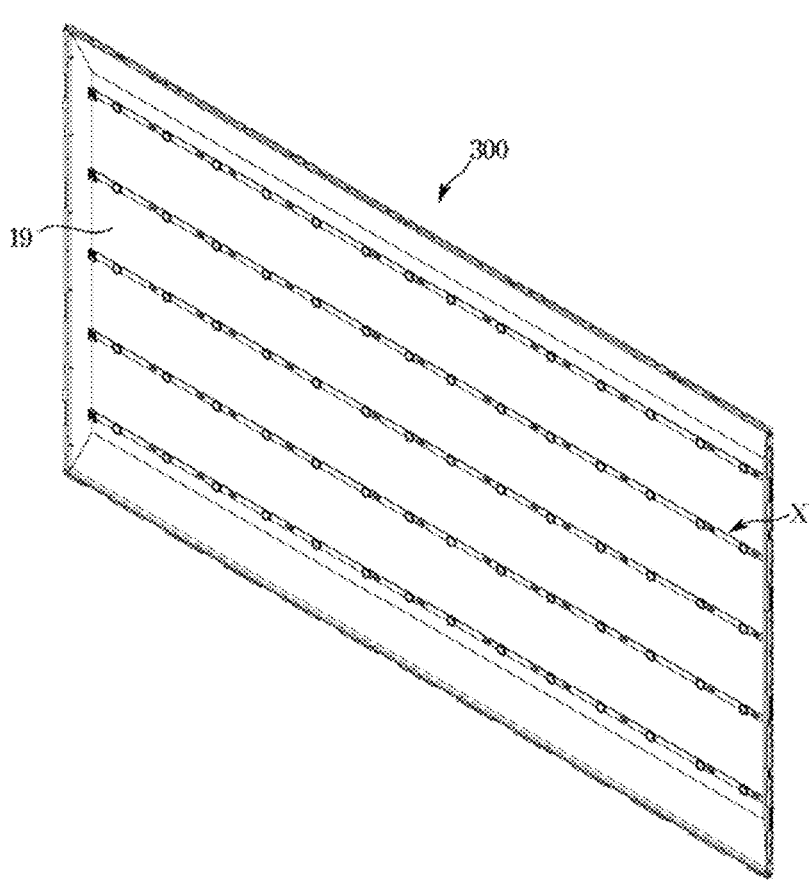
FIG. 4 is a perspective view illustrating a rear configuration of the display apparatus shown in FIG. 2.
Figure 5:
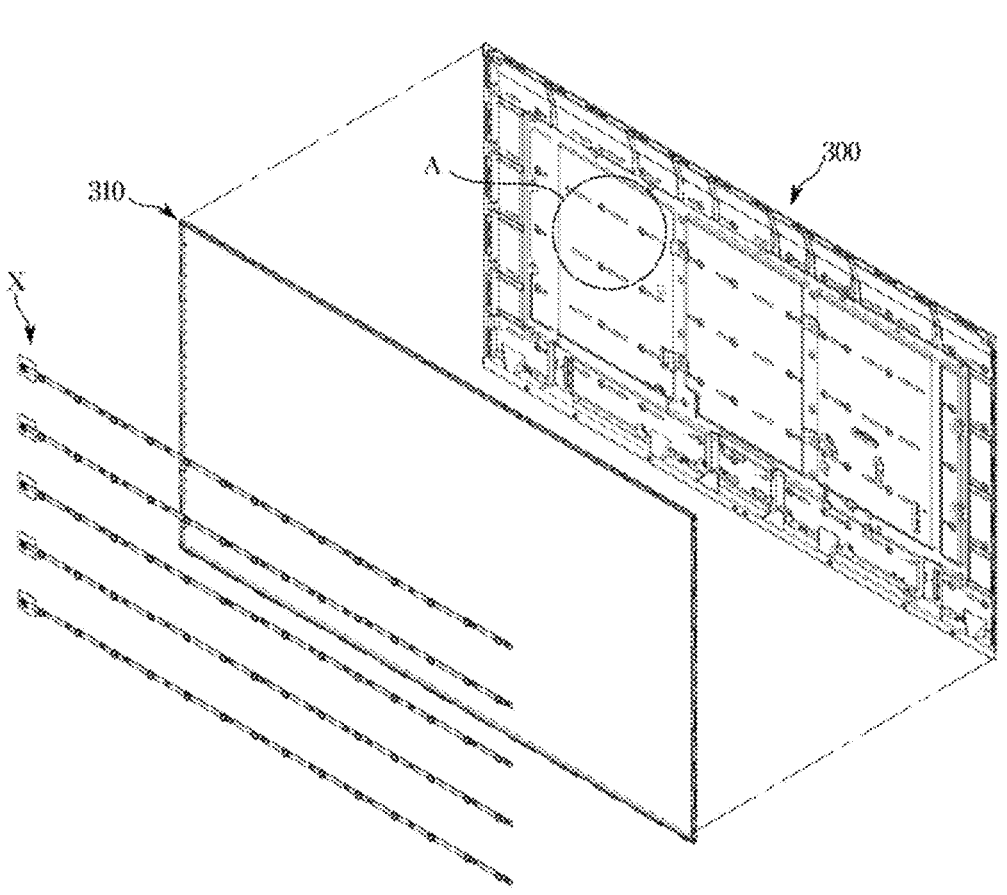
FIG. 5 is an exploded view illustrating the rear configuration of the display apparatus shown in FIG. 4.

FIG. 4 is a perspective view showing a rear configuration of the display apparatus 1 shown in FIG. 2. FIG. 5 is an exploded view showing the rear configuration of the display apparatus 1 shown in FIG. 4.

Referring to FIG. 4, the reflective sheet 19 and the backlight units X may be coupled to the rear chassis 300. According to an aspect of the present disclosure, after the reflective sheet 19 is coupled to the rear chassis 300, the backlight unit X may be coupled to the front side of the reflective sheet 19. Conventionally, after the backlight unit X is coupled to the rear chassis 300, the reflective sheet 19 is coupled to the front side of the backlight unit X, but according to an aspect of the present disclosure, the backlight unit X may be arranged on the front side of the reflective sheet 19. The technical effects thereof will be described later.

Referring to FIG. 5, the reflective sheet 19 may be arranged on the front side of the rear chassis 300, and the backlight unit X may be arranged on the front side of the reflective sheet 19. In other words, the reflective sheet 19 may be pre-coupled to the front side of the rear chassis 300, and then the backlight unit X may be coupled to the rear chassis 300 at the front side of the reflective sheet 19.

A side frame 310 may be coupled around the perimeter of the rear chassis 300. The side frame 310 may prevent an edge portion of the reflective sheet 19 from lifting. A further description of the side frame 310 will be described later.

Figure 6:
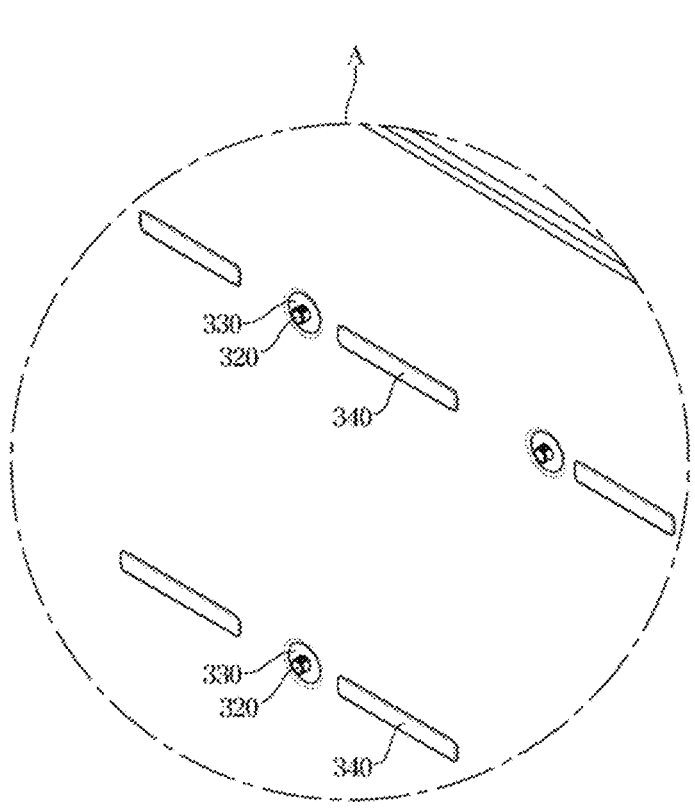
FIG. 6 is an enlarged view of portion A of the display apparatus shown in FIG. 5.

FIG. 6 is an enlarged view showing portion A of the display apparatus 1 shown in FIG. 5.

Referring to FIG. 6, the rear chassis 300 may include a coupling protrusion 320 protruding toward the display panel 10.

The coupling protrusion 320 may be arranged to secure the position of the reflective sheet 19. The coupling protrusion 320 may be inserted into a fixing hole of the reflective sheet 19, which will be described later. The coupling protrusion 320 may be inserted into a coupling hole 211 of the light source board 200, which will be described later. A further description thereof will be described later.

The rear chassis 300 may include a recess 330. The recess 330 may be formed by a rearwardly recessed portion of the rear chassis 300. The recessed portion of the rear chassis 300 may be formed in an approximately circular shape, and the coupling protrusion 320 may be arranged at the center of the recess 330. The recess 330 may be formed in the rear chassis 300 by machining (e.g., embossing). The recess 330 may increase the rigidity of the rear chassis 300. In particular, the recess 330 may prevent the rear chassis 300 from deforming during a process of forming at least one coupling protrusion 320 in the rear chassis 300. The length by which the coupling protrusion 320 protrudes forward of the rear chassis 300 may be greater than the depth by which the recess 330 is recessed rearward of the rear chassis 300.

The rear chassis 300 may include a heat dissipation groove 340. The heat dissipation groove 340 may be formed by a portion of the rear chassis 300 being recessed forward. In other words, the heat dissipation groove 340 may be formed by a portion of the rear chassis 300 protruding forward. When viewed from the front of the rear chassis 300, the heat dissipation groove 340 may protrude forward of the rear chassis 300. When viewed from the rear of the rear chassis 300, the heat dissipation groove 340 may be recessed forward of the rear chassis 300. The recessed or protruding portion of the rear chassis 300 may be provided in an approximately rectangular shape.

The heat dissipation groove 340 may be arranged to contact the light source board 200. The heat dissipation groove 340 may be configured to increase the contact area between the light source board 200 and the rear chassis 300. The increased the contact area between the light source board 200 and the rear chassis 300 may cause the heat dissipation groove 340 to efficiently dissipate heat from the light source board 200 through the rear chassis 300. This may improve the heat dissipation performance of the display apparatus 1.

According to an embodiment of the present disclosure, the depth at which the recess 330 is recessed rearwardly into the rear chassis 300 may be greater than the depth at which the heat dissipation groove 340 is recessed forwardly into the rear chassis 300. The length of the heat dissipation groove 340 in a left-to-right direction may be greater than the length of the recess 330 in the left-to-right direction. The length of the heat dissipation groove 340 in an up-and-down direction may be less than the length of the recess 330 in the up-and-down direction.

In the rear chassis 300, the recess 330, the coupling protrusion 320, and the heat dissipation groove 340 may be arranged along the left-to-right direction. In this case, the recess 330, the coupling protrusion 320, and the heat dissipation groove 340 may be arranged to be spaced apart from each other.

The reflective sheet 19 may include a coupling hole 211 into which the coupling protrusion 320 is inserted. The coupling protrusion 320 may be inserted into the coupling hole 211, and a diameter of the coupling hole 211 may be arranged to correspond to an outer diameter of the coupling protrusion 320. By arranging the diameter of the coupling hole 211 to correspond to the outer diameter of the coupling protrusion 320, foreign matter such as dust may be prevented from entering a gap between the coupling protrusion 320 and the coupling hole 211 when the coupling protrusion 320 is inserted into the coupling hole 211.

The reflective sheet 19 may further include a heat dissipation hole into which the heat dissipation groove 340 is inserted. As described above, the heat dissipation groove 340 may be formed by a portion of the rear chassis 300 protruding forward. The heat dissipation groove 340 protruding forward of the rear chassis 300 may be inserted into a heat dissipation hole formed in the reflective sheet 19. The heat dissipation hole may be arranged to correspond in size to the heat dissipation groove 340.

The light source board 200 may be configured to cover the heat dissipation hole. To prevent foreign matter such as dust from entering the display apparatus 1 through the heat dissipation hole, the light source board 200 may cover the heat dissipation hole from the front side of the reflective sheet 19. In addition, the heat dissipation groove 340 may be inserted into the heat dissipation hole, so that foreign matter from entering through the heat dissipation hole may be substantially blocked.

The coupling holes 211 and the heat dissipation holes may be arranged along the left-to-right direction in which the light source board 200 extends, and may be arranged to be spaced apart from each other. In addition, the coupling holes 211 and the heat dissipation holes may be arranged to be spaced apart from each other along the up-and-down direction. According to an embodiment of the present disclosure, the light source board 200 may be arranged in five rows along the up-and-down direction. However, the present disclosure is not limited thereto, and may be changed depending on the size of the display apparatus 1, and the like.

Figure 7:
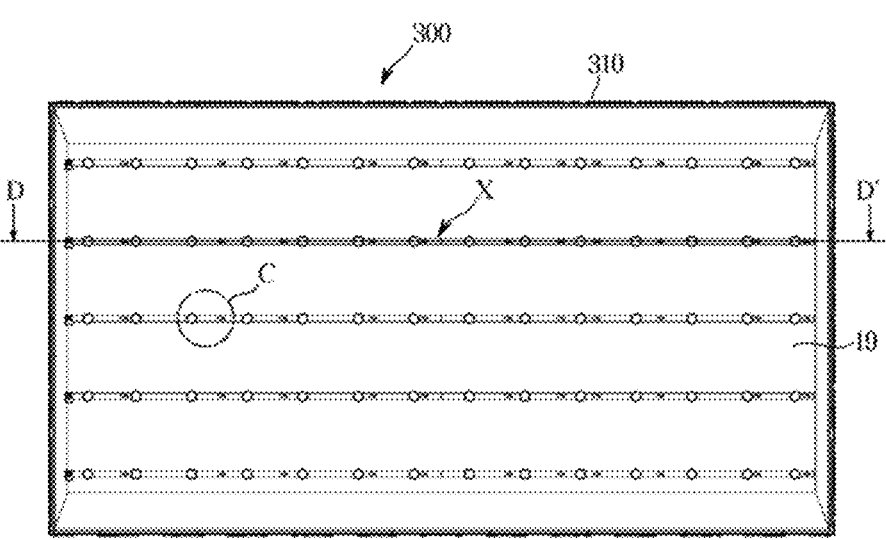
FIG. 7 is a front view illustrating the rear configuration of the display apparatus shown in FIG. 4.

FIG. 7 is a front view showing the rear configuration of the display apparatus 1 shown in FIG. 4.

Referring to FIG. 7, in the display apparatus 1 according to an embodiment of the present disclosure, the backlight unit X may be coupled to the rear chassis 300 such that the backlight unit X is arranged on the front side of the reflective sheet 19.

The backlight unit X may include the light source board 200 extending in the left-to-right direction in the drawings, and the plurality of light sources 110 mounted on the plurality of boards. The plurality of light sources 110 may be arranged to be spaced apart from each other along the direction in which the light source board 200 extends.

The light source boards 200 may be arranged to be spaced apart from the each other in the vertical direction, and according to an embodiment of the present disclosure, the light source board 200 may be arranged in five rows in the vertical direction. As described above, the number of rows of the plurality of boards arranged in the vertical direction may be varied.

In addition, the light source board 200 may be arranged in two consecutive rows in the left-to-right direction. However, the present disclosure is not limited thereto, and the plurality of boards may be arranged in three or more consecutive rows in the left-to-right direction, or may be provided as a single board elongated in the left-to-right direction.

A front surface of the light source board 200 may be coated with a highly reflective paint. This may be to reduce the difference in reflectivity between the reflective sheet 19 and the front surface of the light source board 200. Conventionally, the reflective sheet 19 is arranged on the front side of the board, and the reflective sheet 19 includes the lens hole penetrating the reflective sheet 19. On the board, the LEDs as the light source 110 and the lens 130 covering the LEDs to disperse light are mounted. The lens 130 is exposed to the front side of the reflective sheet 19 through the lens hole, and the reflective sheet 19 covers the entire area of the board from the front side except for the lens hole. Accordingly, the difference in reflectivity between the front surface of the board and the reflective sheet 19 does not cause a problem.

According to the idea of the present disclosure, since the light source board 200 is arranged on the front side of the reflective sheet 19, the reflective sheet 19 may not cover the light source board 200. Therefore, the difference in reflectivity between the front surface of the reflective sheet 19 and the light source board 200 may be problematic. To reduce such a difference in reflectivity, the front surface of the light source board 200 according to an embodiment of the present disclosure may be coated with a highly reflective paint, as described above.

Figure 8:
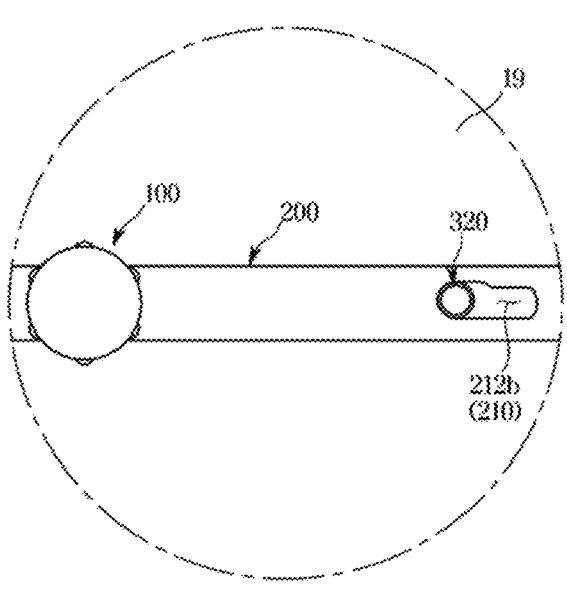
FIG. 8 is an enlarged view of portion C of the display apparatus shown in FIG. 7.
Figure 9:
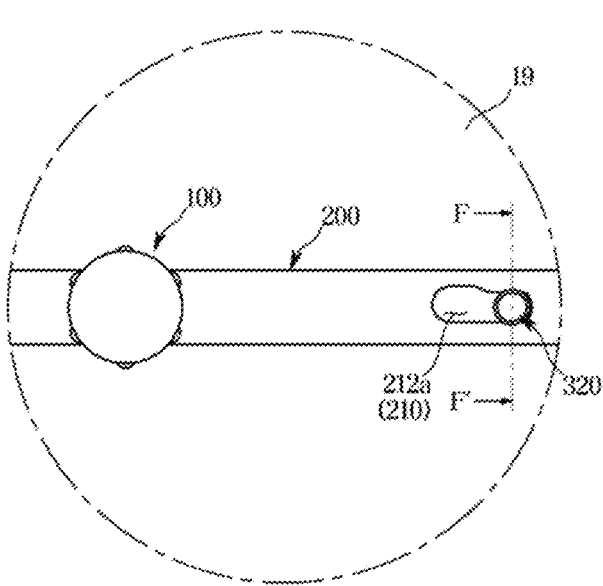
FIG. 9 is an enlarged view illustrating movement of a light source module in portion C of the display apparatus shown in FIG. 8.

FIG. 8 is an enlarged view showing portion C of the display apparatus 1 shown in FIG. 7. FIG. 9 is an enlarged view showing movement of the light source module 100 in the portion C of the display apparatus 1 shown in FIG. 8.

Referring to FIGS. 8 and 9, the backlight unit X will be described as being slidably coupled to the rear chassis 300.

The reflective sheet 19 may be seated on the rear chassis 300. As described above, the forwardly protruding coupling protrusion 320 may be arranged on the rear chassis 300, and a fixing hole may be arranged on the reflective sheet 19 into which the coupling protrusion 320 is inserted.

The rear chassis 300 may be provided with the plurality of coupling protrusions 320, and the reflective sheet 19 may be provided with the plurality of fixing holes corresponding to the number of coupling protrusions 320.

By inserting the plurality of coupling protrusions 320 into the plurality of fixing holes, respectively, the reflective sheet 19 may be seated on the rear chassis 300. In doing so, the reflective sheet 19 may not be fully secured on the rear chassis 300. The reflective sheet 19 may be temporarily secured so that it does not move in the left-to-right direction on the rear chassis 300, and as will be described later, the reflective sheet 19 may be fully secured to the rear chassis 300 by coupling the backlight unit X to the rear chassis 300 and then coupling the side frame 310 to the rear chassis 300.

The diameter of the fixing hole may be arranged to correspond to the outer diameter of the coupling protrusion 320. When the coupling protrusion 320 is inserted into the fixing hole, to prevent dust from entering the gap between the coupling protrusion 320 and the fixing hole, the outer diameter of the coupling protrusion 320 and the diameter of the fixing hole may be configured to correspond.

Conventionally, a lens hole having a diameter larger than the outer diameter of the lens 130 is provided so that the lens 130 may be inserted into the reflective sheet 19. Foreign matter such as dust may enter an inside of the display apparatus 1 through the lens hole, which may cause quality degradation problems.

According to an embodiment of the present disclosure, the reflective sheet 19 may be provided with the fixing hole into which the coupling protrusion 320 may be inserted. The size of the fixing hole may be smaller than that of the conventional lens hole, and the sizes of the fixing hole and the coupling protrusion 320 may be provided to correspond to each other and thus a space between the coupling protrusion 320 and the fixing hole may be very small. As a result, foreign matter such as dust may be substantially blocked from entering the gap between the coupling protrusion 320 and the fixing hole. Since the introduction of foreign matter into the inside of the display apparatus 1 is blocked, the quality of the display apparatus 1 may be improved.

After the reflective sheet 19 is seated on the rear chassis 300, the backlight unit X may be coupled to the rear chassis 300. In response to the backlight unit X being coupled to the rear chassis 300, the reflective sheet 19 may be prevented from separating forwardly from the rear chassis 300.

The light source 110 may be mounted on the light source board 200. The light source board 200 may include the coupling hole 211. The coupling protrusion 320 may be inserted into the coupling hole 211, and the coupling protrusion 320 may be slidably movable within the coupling hole 211.

After the coupling protrusion 320 is inserted into one side of the coupling hole 211, the coupling protrusion 320 may be moved to the other side of the coupling hole 211 by sliding the light source board 200. Based on the coupling protrusion 320 being positioned on one side of the coupling hole 211, the light source board 200 may be separated from the rear chassis 300. This is because the coupling protrusion 320 may pass through one side of the coupling hole 211. Based on the coupling protrusion 320 sliding and being positioned on the other side of the coupling hole 211, the light source board 200 may be secured so as not to be separated from the rear chassis 300. This is because the coupling protrusion 320 may not pass through the other side of the coupling hole 211.

The coupling hole 211 may include a first fastening portion 212*a* and a second fastening portion 212*b* having different widths. The first and second fastening portions 212*a* and 212*b* may have different widths in a width direction of the light source board 200. In this case, the width direction may refer to the up-and-down direction in the drawings. The second fastening portion 212*b* may have a smaller width than the first fastening portion 212*a* in the width direction of the light source board 200.

At least a portion of the first fastening portion 212*a* may have a curved shape.

The second fastening portion 212*b* may be connected to the first fastening portion 212*a* in the longitudinal direction of the light source board 200. In this case, the longitudinal direction of the board may refer to the left-to-right direction in the drawings. The second fastening portion 212*b* may be connected to the first fastening portion 212*a* such that the coupling protrusion 320 is fastened to the coupling hole 211 and is movable between the first fastening portion 212*a* and the second fastening portion 212*b*.

As described above, the length of the second fastening portion 212*b* in the up-and-down direction may be set to be smaller than the length of the first fastening portion 212*a* in the up-and-down direction. The width of the first fastening portion 212*a* may be set to be larger than the outer diameter of the coupling protrusion 320 to allow the coupling protrusion 320 to pass therethrough. The width of the second fastening portion 212*b* may be set to be smaller than the outer diameter of the coupling protrusion 320 to prevent the coupling protrusion 320 from passing therethrough.

The coupling protrusion 320 may be inserted into the first fastening portion 212*a* of the coupling hole 211 after passing through the fixing hole of the reflective sheet 19. By sliding the coupling protrusion 320 inserted into the first fastening portion 212*a* to the second fastening portion 212*b*, the light source board 200 may be secured to the rear chassis 300. Generally, the light source board 200 may be slid from the first fastening portion 212*a* to the second fastening portion 212*b* by causing the light source board 200 to slide in the left-to-right direction. In response to sliding of the coupling protrusion 320 from the first fastening portion 212*a* to the second fastening portion 212*b*, the second fastening portion 212*b* may be inserted into a fastening groove 321 formed in the coupling protrusion 320, so that the light source board 200 may be fixed thereto.

Figure 10:
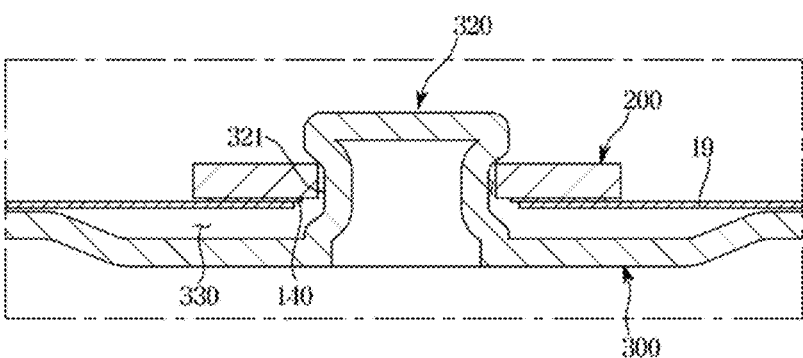
FIG. 10 is a cross-sectional view taken along line F-F' of the display apparatus shown in FIG. 9.

FIG. 10 is a cross-sectional view taken along line F-F' of the display apparatus 1 shown in FIG. 9.

With reference to FIG. 10, a method of coupling a backlight module according to an embodiment of the present disclosure to the rear chassis 300 will be described.

The fastening groove 321 may be formed by being recessed along at least a portion of the perimeter of the coupling protrusion 320. The fastening grooves 321 may be formed on one side and the other side of the coupling protrusion 320, respectively.

The coupling protrusion 320 may be slidably movable to engage the second fastening portion 212*b* in the fastening groove 321. Once the second fastening portion 212*b* is engaged in the fastening groove 321, the light source board 200 may be fixedly coupled to the rear chassis 300. Once the light source board 200 is fixedly coupled to the rear chassis 300, the reflective sheet 19 arranged between the light source board 200 and the rear chassis 300 may be fixedly coupled to the rear chassis 300.

The fixing hole may be arranged to have a diameter larger than the outer diameter of the coupling protrusion 320, and the width of the second fastening portion 212*b* may be arranged to be smaller than the outer diameter of the coupling protrusion 320. The fastening groove 321 may be formed on a side of the coupling protrusion 320 corresponding to the second fastening portion 212*b*, and the second fastening portion 212*b* may be inserted into the fastening groove 321, so that the light source board 200 may be fixedly coupled to the rear chassis 300.

Figure 11:
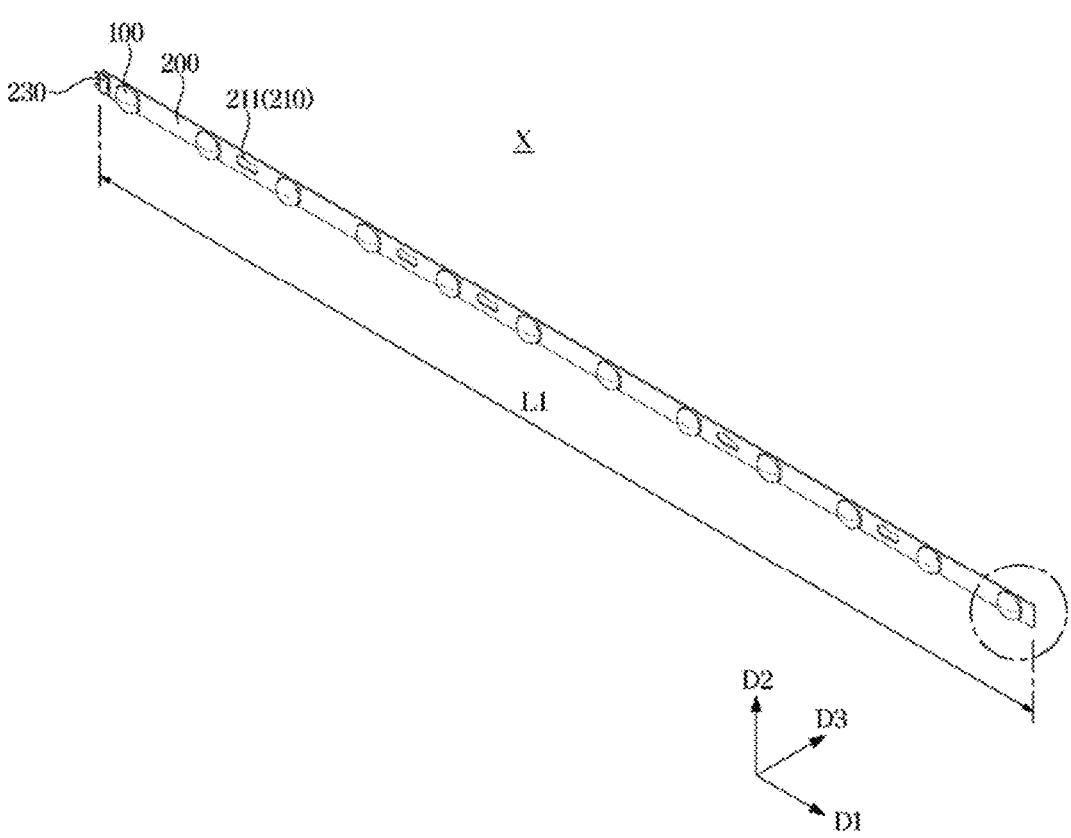
FIG. 11 is a perspective view of the backlight unit shown in FIG. 5.
Figure 12:
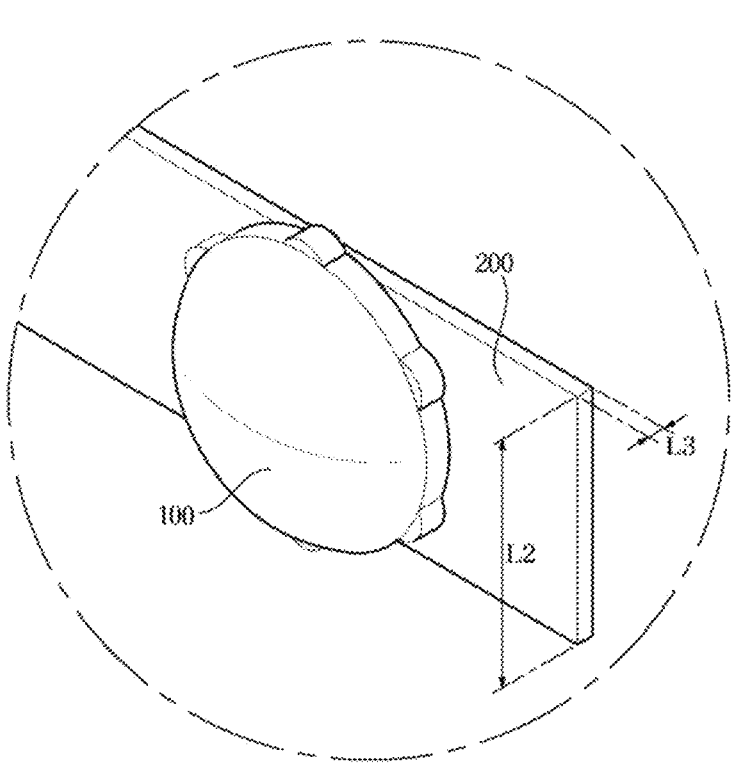
FIG. 12 is an enlarged view of a portion of the backlight unit shown in FIG. 11.

FIG. 11 is a perspective view showing the backlight unit X shown in FIG. 5. FIG. 12 is an enlarged view showing a portion of the backlight unit X shown in FIG. 11.

With reference to FIGS. 11 and 12, the backlight unit X according to an embodiment of the present disclosure will be described.

The display apparatus 1 may include the backlight unit X. The backlight unit X may be configured to emit light from the light source 110.

The backlight unit X may extend in one direction. The plurality of light sources 110 may be arranged along an extension direction of the backlight unit X.

The backlight units X may be provided in a plurality. The plurality of backlight units X may be arranged in a direction intersecting the direction in which the plurality of light sources 110 are arranged. Accordingly, the plurality of light sources 110 may be arranged in two dimensions.

The backlight unit X may be arranged to extend along a long side of the rear chassis 300. The backlight unit X may be arranged to extend along a transverse side of the rear chassis 300.

The backlight unit X may include the light source board 200. The light source board 200 may be a board on which the light source 110 may be mounted.

The light source board 200 may be connected to the power board 410 (see FIG. 2).

The power board 410 may supply power from an external power source to parts connected to the power board 410. The power supplied by the power board 410 to the parts connected to the power board 410 may be varied by the power board 410.

The power board 410 may supply power from an external power source to the light source board 200. The power supplied by the power board 410 to the light source board 200 may be controlled by the power board 410. Accordingly, the power supplied to the light source board 200 may be varied.

The light source board 200 may be electrically connected to the light source 110. Accordingly, the power supplied by the power board 410 to the light source board 200 may be supplied to the light source 110. Accordingly, the light source 110 may emit light.

The light source 110 may emit brighter light when the power supplied by the power board 410 is greater, and may emit less bright light when the power supplied by the power board 410 is less. Based on the light source 110 being an LED, the intensity of light may be determined by the voltage applied to the light source 110. This is because an LED is a type of diode.

The relationship between the power from the power source and light intensity will be described in more detail later with associated drawings.

Circuitry may be printed on the light source board 200. In other words, the light source board 200 may be a printed circuit board. The light source 110, which will be described later, may be positioned on the printed circuit included in the light source board 200.

The light source board 200 may have a plate shape extending in one direction. The light source board 200 may have a bar shape.

An extension direction of the light source board 200 may be referred to as a first direction, and the direction perpendicular to the first direction and lying on the plane of the light source board 200 where the light source 110 is positioned may be referred to as a second direction. A direction perpendicular to the first and second directions may be referred to as a third direction.

The first direction may be a horizontal direction of the light source board 200. The second direction may be a vertical direction of the light source board 200. The third direction may be a thickness direction of the light source board 200.

The light source board 200 may have a length in the horizontal direction of approximately 1600 mm. The light source board 200 may have in a length in the vertical direction of approximately 10 mm. The horizontal length of the light source board 200 may be approximately 160 times the vertical length. Since the horizontal length of the light source board 200 is larger than the vertical length, the light source board 200 may be easily moved in the thickness direction.

The vertical length of the light source board 200 may be 8 mm or more and 20 mm or less.

In some embodiments, the light source board 200 may be cut and used.

For example, when the horizontal length is divided into two equal parts, the horizontal length of the light source board 200 may be approximately 80 times longer than the vertical length.

For example, when the horizontal length is divided into three equal parts, the horizontal length of the light source board 200 may be approximately 50 times longer than the vertical length.

For example, when the horizontal length is divided into four equal parts, the horizontal length of the light source board 200 may be approximately 40 times longer than the vertical length.

The length in the thickness direction of the light source board 200 may be approximately 1 mm. The length in the thickness direction of the light source board 200 may be 0.5 mm or more and 2 mm or less.

The horizontal length of the light source board 200 may be 1600 times longer than the thickness direction length. Accordingly, the light source board 200 may be easily moved in the thickness direction. In other words, the light source board 200 may be easily moved because it is thin.

The light source board 200 may be 200 times longer or more than the thickness.

This will be described in more detail with reference to the associated drawings.

The light source board 200 may be made of aluminum. However, the present disclosure is not limited thereto, and the light source board 200 may be made of metal. Metal is a material of high thermal conductivity. As a result, heat generated by the light source board 200 may be well transferred to the rear chassis 300. As described above, since the rear chassis 300 may have a metallic material, heat generated by the light source board 200 may be dissipated to an outside of the display apparatus 1 through the rear chassis 300.

Because the light source board 200 may have a metallic material, it may have an elastic coefficient of 1 GPa or more. As a result, the light source board 200 may be deformable when a certain range of force is applied.

The light source board 200 may be a plurality. The plurality of light source boards 200 may each be electrically connected to each other.

The light source board 200 may be electrically connectable with the light source 110, which will be described below. The light source board 200 may be enabled to be periodically moved at least partially closer to the rear chassis 300 based on a power from a power source periodically applied to the light source 110. This will be described later with the associated drawings.

The backlight unit X may include a board connector 230. The board connector 230 may be configured to electrically connect each of the plurality of light source boards 200.

The board connector 230 may be coupled to one end of the light source board 200. The board connector 230 may be configured to be connected with a printed circuit board of the light source board 200 or another board connector 230.

The light source board 200 may include a coupling portion 210. The coupling portion 210 may be configured to be coupled to the rear chassis 300.

The coupling portion 210 may be positioned on the light source board 200.

The coupling portion 210 may be positioned to be spaced apart from the light source module 100 described later. At least a portion of the coupling portion 210 may be positioned between each of the light source modules 100.

The coupling portion 210 may be configured to extend in the horizontal direction of the light source board 200, as described above.

The coupling portions 210 may be provided in a plurality. The plurality of coupling portions 210 may be arranged along the extension direction of the light source board 200. The coupling portions 210 may be arranged between the plurality of light source modules 100 described later. Accordingly, the light source module 100 may be arranged between the plurality of coupling portions 210, thereby allowing the light source module 100 to be arranged close to the rear chassis 300.

The plurality of coupling portions 210 may be configured to be coupled with the rear chassis 300.

The light source board 200 may extend in the longitudinal direction. The plurality of coupling portions 210 may be arranged in the longitudinal direction.

The coupling portion 210 may include coupling hole 211. The coupling hole 211 may be configured to allow a portion of the rear chassis 300 to be inserted.

The coupling hole 211 may be configured to allow the coupling protrusion 320 to pass through and be received. As discussed above, the coupling protrusion 320 may be configured to be inserted into the coupling hole 211, so that the backlight unit X may be coupled to the rear chassis 300.

The coupling hole 211 may be configured to penetrate the light source board 200.

The light source board 200 may include a vibrating portion 220. The vibrating portion 220 may be configured to be positioned between the coupling portions 210.

The vibrating portion 220 may include the vibrating portion 220 positioned between the coupling portions 210 such that a distance from the rear chassis 300 is variable.

The backlight unit X may include the light source module 100. The light source module 100 may be configured to emit light.

The light source module 100 may be positioned on the light source board 200. The light source module 100 may be positioned on the front side of the light source board 200. Thus, the light source module 100 may emit light toward the display panel 10.

The light source module 100 may have a width greater than or equal to the length in the height direction of the board. This may allow the light source module 100 to cover a larger portion of the rear chassis 300.

Figure 13:
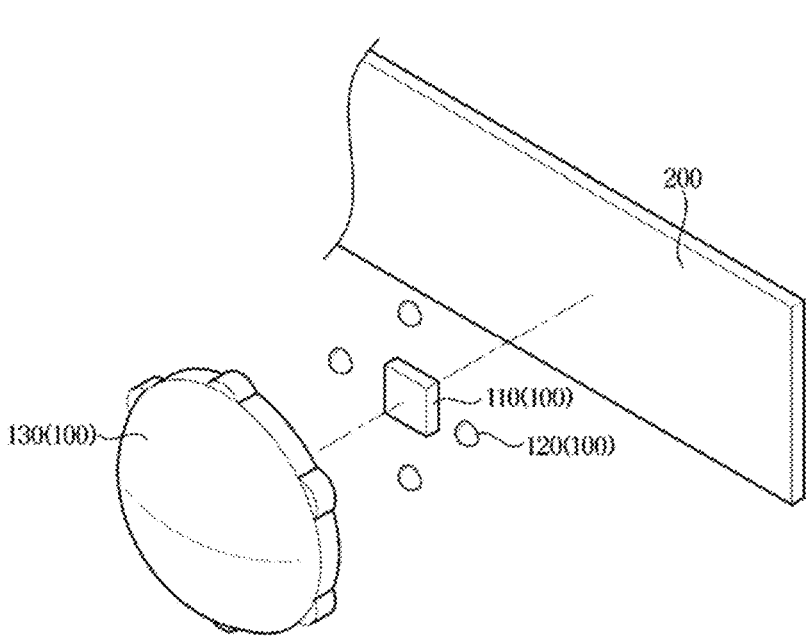
FIG. 13 is a graph showing an exploded view of the portion of the backlight unit shown in FIG. 11.

FIG. 13 is a graph showing an exploded view of a portion of the backlight unit X shown in FIG. 11.

With reference to FIG. 13, the light source module 100 according to an embodiment of the present disclosure will be described.

The backlight unit X may include the light source module 100.

The light source module 100 may include the light source 110. The light source 110 may be a configuration that emits light.

The light source 110 may be electrically connected to the light source board 200. The light source 110 may emit light as the current flowing in the light source board 200 flows into the light source 110.

The light source 110 may emit blue light. However, the present disclosure is not limited thereto, and the light source 110 may emit white light.

The light source 110 may include an LED.

The light source 110 may be configured to emit light periodically by power from a power source that is periodically applied to adjust the intensity of the light.

The light source module 100 may include a light emitter 120. The light emitter 120 may be configured to absorb the light emitted from the light source 110 and emit light of a different wavelength.

The light emitter 120 may be positioned on the light source board 200. The light emitter 120 may be positioned in front of the light source board 200.

The light emitter 120 may have a material similar to the color conversion sheet 14.

The color conversion sheet 14 may convert the light emitted from the light source 110 into light with a wavelength corresponding to red, a wavelength corresponding to green, and a wavelength corresponding to blue, respectively. In other words, the light passing through the color conversion sheet 14 may be converted into red, green, and blue.

The light passing through the color conversion sheet 14 may be converted into white light with a combination of red, green, and blue.

The light passing through the color conversion sheet 14 may pass through a color filter, and the light passing through the color filter may be delivered to a user. In order for the user to recognize the light passing through the color filter, it may necessary for white light to be incident on the color filter. Therefore, the color conversion sheet 14 may be required.

However, the color conversion sheet 14 required by the display apparatus 1 may vary depending on the size of the product, and the type and intensity of the light source 110.

If the color conversion sheet 14 is used differently for each display apparatus 1, the production cost may increase. This is because the color conversion sheet 14 must be manufactured separately for each display apparatus 1.

Accordingly, the color conversion sheet 14 may be used identically for each display apparatus 1. In addition, to adjust the degree of change in wavelength required for each display apparatus 1, the light emitter 120 may be provided.

The light emitter 120 may absorb light emitted from the light source 110 and emit red, green, and blue. In addition, the color conversion sheet 14 may absorb light emitted from the light source 110 and emit red, green, and blue. By the light emitter 120 and the color conversion sheet 14, the light emitted from the light source 110 may be emitted in red, green, and blue to a desired degree.

In other words, the light emitter 120 may convert the wavelength of the light emitted from the light source 110 into other multiple wavelengths.

At this time, a sound-absorbing layer Y, e.g., having a first material, may include the same material as the light emitter 120, e.g., having a second material, so that it may be produced by a process of forming the light emitter 120. This will be described later with the associated drawings.

The light emitter 120 may be provided in a plurality. The plurality of light emitters 120 may be arranged to surround the light source 110.

The plurality of light emitters 120 may be arranged on the top, bottom, left, and right sides of the light source 110.

The light source module 100 may include the lens 130. The lens 130 may be configured to disperse the light emitted from the light source 110.

The lens 130 may be configured to cover the light source 110. The lens 130 may be configured to cover the light emitter 120.

The lens 130 may be positioned in front of the light source 110 or the lens 130.

The lens 130 may be located on the light source board 200. The lens 130 may be positioned in front of the light source board 200.

The lens 130 may be the concave lens 130. The lens 130 may have a convex outer surface.

The lens 130 may be configured to transmit light.

Figure 14:
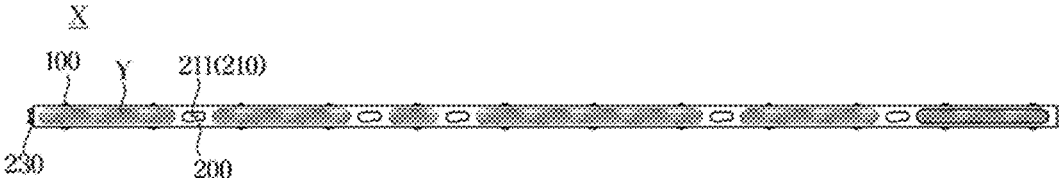
FIG. 14 is a perspective view of a rear side of the backlight unit shown in FIG. 11.
Figure 15:
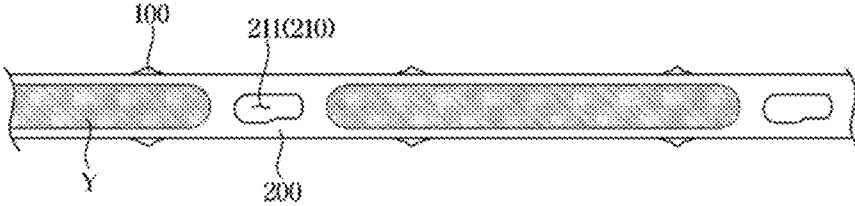
FIG. 15 is an enlarged view of the rear side of the backlight unit shown in FIG. 14.

FIG. 14 is a perspective view showing a rear side of the backlight unit X shown in FIG. 11. FIG. 15 is an enlarged view showing the rear side of the backlight unit X shown in FIG. 14.

With reference to FIGS. 14 and 15, the sound-absorbing layer Y of the backlight unit X according to an embodiment of the present disclosure will be described.

The backlight unit X may include the sound-absorbing layer Y. The sound-absorbing layer Y may be configured to reduce noise.

The sound-absorbing layer Y may be positioned on the light source board 200 so as to reduce noise caused by the light source board 200 and the rear chassis 300.

The sound-absorbing layer Y may be positioned on the light source board 200. The sound-absorbing layer Y may be positioned on the rear side of the light source board 200. The sound-absorbing layer Y may be positioned between the light source board 200 and the rear chassis 300. Accordingly, the sound-absorbing layer Y may reduce noise caused by the light source board 200 contacting the rear chassis 300.

The sound-absorbing layer Y may be configured to be attached to the light source board 200. This may eliminate the need for a separate process to fix the sound-absorbing layer Y, thereby speeding up the process.

The sound-absorbing layer Y may be configured to be spaced apart from the coupling hole 211. The coupling hole 211 may be provided by penetrating the light source board 200, the sound-absorbing layer Y may be arranged to avoid the coupling hole. The sound-absorbing layer Y may be arranged to prevent the coupling protrusion 320 from interfering with the insertion into the coupling hole 211.

The sound-absorbing layer Y may be provided in a plurality. The plurality of sound-absorbing layers Y may be arranged along the extension direction of the light source board 200. The plurality of sound-absorbing layers Y may be arranged with the coupling hole 211 therebetween.

In other words, the coupling portion 210 may have the coupling hole 211, and the rear chassis 300 may include the coupling protrusion 320 that is configured to penetrate the coupling hole 211 so as to be inserted into the coupling hole 211 and couple the light source board 200 and the rear chassis 300, and the sound-absorbing layer Y may be coupled to the vibrating portion 220 of the light source board 200 to prevent shielding of the coupling hole 211.

The sound-absorbing layer Y may be provided integrally with the light source board 200. The sound-absorbing layer Y may be combined with or separated from the rear chassis 300 together with the light source board 200. As a result, the time for producing the backlight unit X may not to be significantly increased although the sound-absorbing layer Y is added. This is because the process of combining the light source board 200 with the rear chassis 300 together with the sound-absorbing layer Y may be shortened.

The sound-absorbing layer Y may have an epoxy material. The epoxy material may have anti-noise properties, friction noise between the rear chassis 300 and the light source board 200 may be reduced by means of the sound-absorbing layer Y.

Furthermore, the sound-absorbing layer Y may have the same material as the light emitter 120 that may include the light source module 100. Accordingly, a device for producing the light emitter 120 may be used to produce the light emitter 120 and the sound-absorbing layer Y. This will be described in detail with the associated drawings.

The sound-absorbing layer Y may have a thickness of 100 m or less. The sound-absorbing layer Y may have a thickness of 50 m or less. However, the present disclosure is not limited thereto, and the sound-absorbing layer Y may have a maximum thickness that a device for producing the light emitter 120 may produce.

The sound-absorbing layer Y may be arranged to cover a portion of a surface of the light source board 200 facing the rear chassis 300. The sound-absorbing layer Y may be arranged to be spaced apart from an edge portion of the light source board 200. The sound-absorbing layer Y may be positioned on an inner side of the light source board 200.

The reason why the sound-absorbing layer Y is necessary is that sound may be generated when the light source board 200 comes into contact with the rear chassis 300. In particular, the light source board 200 may be made of aluminum or metal, and the rear chassis 300 may be made of metal. Since metal and metal may generate a metallic friction sound when they collide, so the light source board 200 and the rear chassis 300 may generate a metallic friction sound. The light source board 200 may generate a metallic friction sound when it comes in contact with the rear chassis 300.

Briefly, the light source board 200 and the rear chassis 300 may come into contact while moving the display apparatus 1, causing noise. In some embodiments, the light source board 200 may come into contact with the rear chassis 300 while vibration may occur in the display apparatus 1. This may cause friction noise between the light source board 200 and the rear chassis 300.

In addition, due to the reasons described below, the light source board 200 may generate noise as it rubs against the rear chassis 300.

Figure 16:
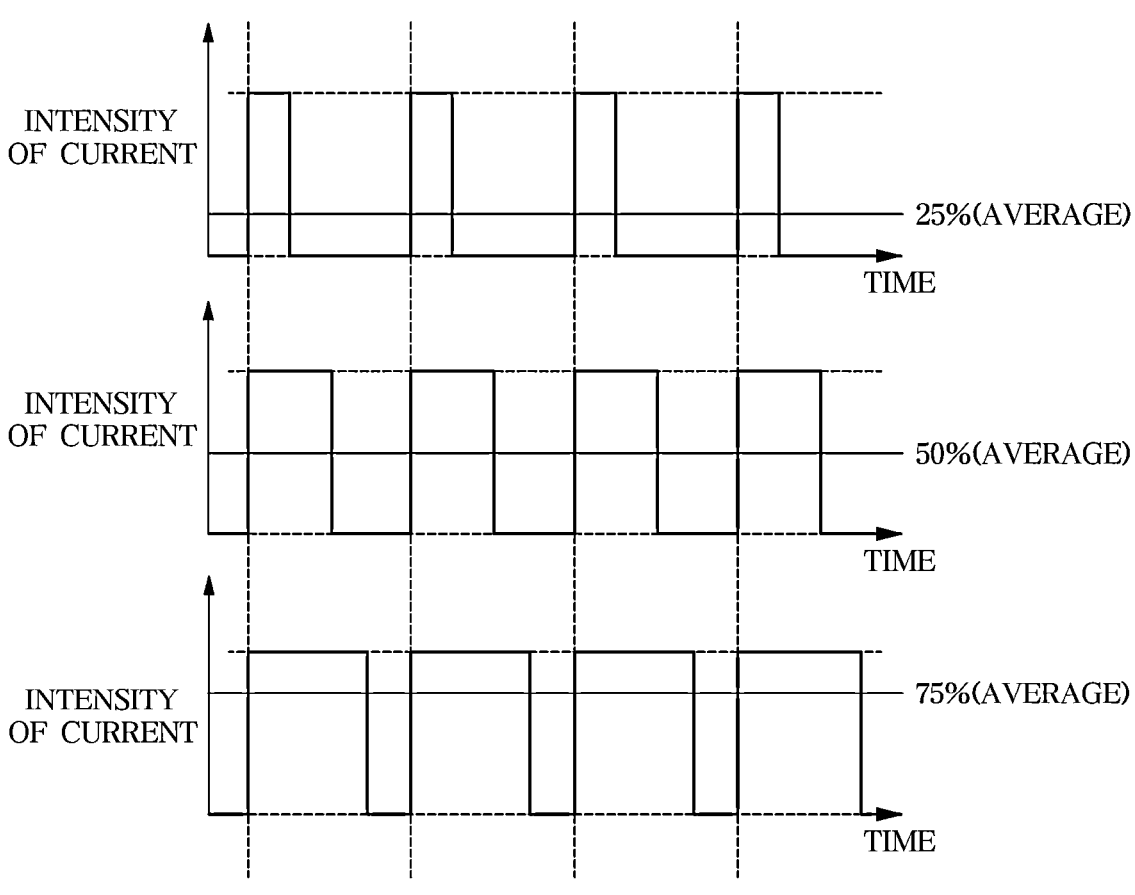
FIG. 16 is a graph illustrating a current flowing through the backlight unit shown in FIG. 11.

FIG. 16 is a graph showing a current flowing in the backlight unit X shown in FIG. 11.

With reference to FIG. 16, the current flowing in the backlight unit X according to an embodiment of the present disclosure will be described.

The display apparatus 1 may include the power board 410 capable of supplying power to the backlight module.

The display apparatus 1 may include the backlight module.

The backlight module may include the light source module 100. The light source module 100 may emit light.

The display apparatus 1 may need to adjust the intensity of the light as required. This is because the displayed screen may vary depending on the intensity of the light applied to the display panel 10.

The intensity of the light emitted by the light source module 100 may be controlled by adjusting the intensity of the current flowing through the light source module 100. The intensity of the current flowing through the light source module 100 may be controlled by adjusting the voltage applied to the light source module 100. In other words, it may be controlled by adjusting the power applied to the light source module 100.

In response to a high voltage being applied to the light source module 100, a high current may flow. In response to a strong current flowing through the light source module 100, the intensity of light may be strong. However, it is not easy to control the current flowing through the light source module 100 to the required level. A method of controlling the current may be by using a variable resistor, for example.

The method of controlling the magnitude of the voltage or the intensity of the current itself may not be based on the method described above.

A method of controlling the magnitude of the voltage or the intensity of the current itself may be, for example, a pulse width modulation (PWM).

The PWM method is a type of pulse modulation that modulates the pulse width based on the magnitude of the signal. The PWM method is a method of controlling the frequency of the power supply by switching on or off while keeping the power constant. In some embodiments, the PWM may be used to control the frequency at which voltage is applied or current flows.

When the voltage or current is applied periodically by the PWM method, the average voltage or current may be regulated according to the cycle at which the voltage or current is applied.

For example, the current flowing in the light source module 100 may flow at a ratio of 3:1 between the time when the current is flowing and the time when the current is not flowing. In other words, the current may flow relatively 3 times, and the current may flow relatively 1 time. Furthermore, such current flow may occur periodically.

In this case, the current flowing on average may be considered to be a current of 75% of the maximum current applied.

For example, the current flowing in the light source module 100 may flow at a ratio of 1:1 between the time the current is flowing and the time the current is not flowing. In other words, the current may flow relatively one time, and the current may flow relatively one time. Furthermore, such current flow may occur periodically.

In this case, the current flowing on average may be considered to be a current of 50% of the maximum current applied.

For example, the current flowing in the light source module 100 may flow at a ratio of 1:3 between the time when the current is flowing and the time when the current is not flowing. In other words, the current may flow relatively one time, and the current may flow relatively 3 times. Furthermore, such current flow may occur periodically.

In this case, the current flowing on average may be considered to be a current of 25% of the maximum current applied.

In summary, the current flowing in the light source module 100 may flow periodically with a ratio of n:1 between the time when the current is flowing and the time when the current is not flowing. In this case, the current may be considered to be a current of $n/(1+n)$ of the maximum current applied.

To provide current to the light source module 100, the power board 410 may transfer power to the light source module 100 through the light source board 200. This process may cause current to flow in the light source board 200.

As the current may periodically flow on and off in the light source module 100, and the current may also periodically flow on and off in the light source board 200.

The method of controlling the intensity of the current by using the PWM method is advantageous in that the intensity of the current may be adjusted by allowing the current to flow and then blocking the current by a switch or the like without controlling the maximum value of the current. The power board 410 may be provided to enable such PWM control.

The power board 410 may include a switching mode power supply (SMPS). In other words, the power board 410 may act as a switch to allow or block external power, thereby realizing PWM control of the current. The SMPS may be configured to periodically turn on or off the power applied to the light source 110.

As will be described later, the light source board 200 and the rear chassis 300 may or may not come into contact with each other depending on whether the current is flowing or is not flowing. In a case where the light source board 200 and the rear chassis 300 come into contact, a sound may be generated.

Because the current may or may not flow periodically, the sound may be generated periodically.

Recently, some media may require current control at high frequencies may have appeared. In particular, high quality images and colorful images may require fast current control. In other words, high-frequency current control may be necessary in recent years.

High-frequency current control may cause the sound to have at a high frequency. Humans may be more sensitive to high-frequency sounds than low-frequency sounds. Therefore, the challenge of preventing such sounds may become increasingly important recently when high-frequency current control is required.

The frequency of high-frequency current control may be 500 Hz or higher. In other words, the power applied periodically may be arranged to have a frequency of 500 Hz or higher.

In particularly, the frequency of high-frequency current control may be 800 Hz or higher.

Figure 17:
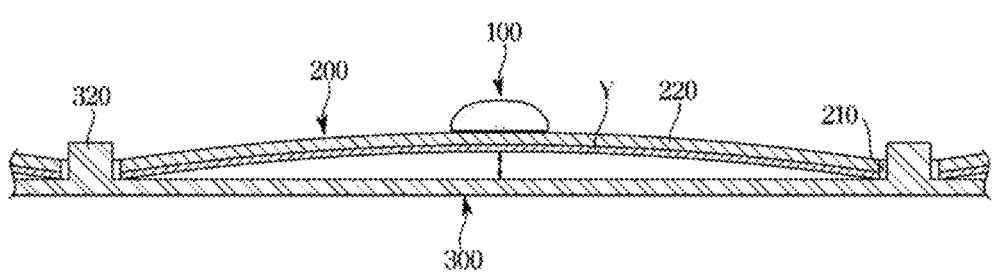
FIG. 17 is a cross-sectional view illustrating the movement of the backlight unit shown in FIG. 11 when current flows as shown in the graph of FIG. 14.

FIG. 17 is a cross-sectional view showing the movement of the backlight unit X shown in FIG. 11 when the current flows as shown in the graph of FIG. 14.

With reference to FIG. 17, the movement of the backlight unit X according to an embodiment of the present disclosure will be described.

Current may flow on and off periodically in the light source module 100. Accordingly, the light source board 200 may have current flowing on and off periodically.

In response to the current periodically flowing on and off in the light source board 200, a magnetic field may be formed on the light source board 200. When a magnetic field is formed on the light source board 200, it may interact with the rear chassis 300. In other words, the light source board 200 may periodically move closer to the rear chassis 300.

In particular, the coupling portion 210 of the light source board 200 may be coupled with the rear chassis 300. The vibrating portion 220 of the light source board 200 may be positioned to be spaced apart from the rear chassis 300.

In response to the current periodically flowing through the light source board 200, the vibrating portion 220 of the light source board 200 may periodically move closer to and further away from the rear chassis 300. In this case, the light source board 200 and the rear chassis 300 may generate friction noise.

To prevent friction noise between the light source board 200 and the rear chassis 300, the backlight unit X may include the sound-absorbing layer Y positioned between the light source board 200 and the rear chassis 300.

Hereinafter, a manufacturing process of the sound-absorbing layer Y will be described.

Figure 18:
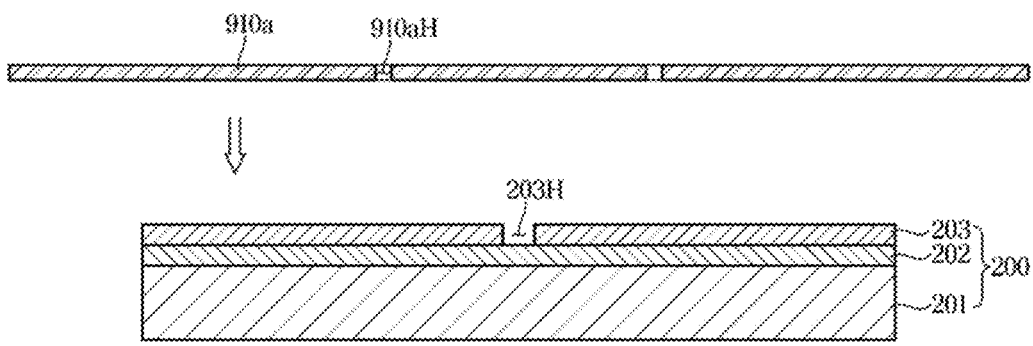
FIG. 18 is a conceptual view illustrating a portion of a process of forming a light emitter in the backlight unit shown in FIG. 11.
Figure 19:
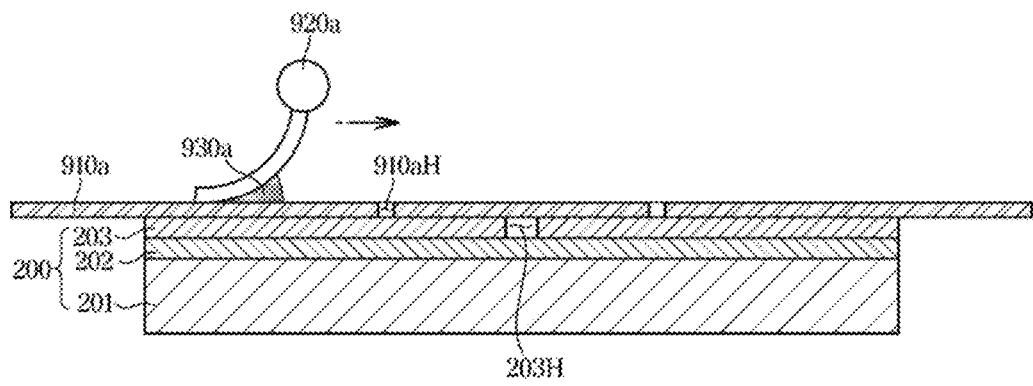
FIG. 19 is a conceptual view illustrating a portion of the process of forming the light emitter in the backlight unit shown in FIG. 18.
Figure 20:
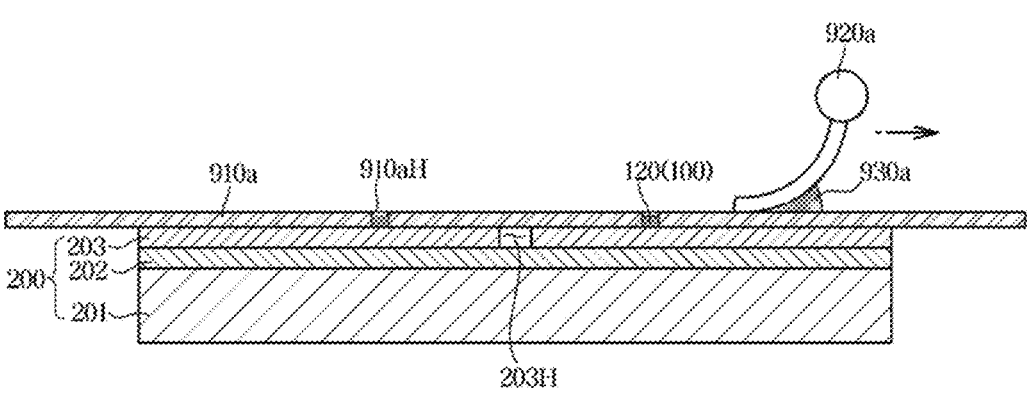
FIG. 20 is a conceptual view illustrating a portion of the process of forming the light emitter in the backlight unit shown in FIG. 19.

FIG. 18 is a conceptual view showing a portion of a process of forming the light emitter 120 in the backlight unit X shown in FIG. 11. FIG. 19 is a conceptual view showing a portion of the process of forming the light emitter 120 in the backlight unit X shown in FIG. 18. FIG. 20 is a conceptual view showing a portion of the process of forming the light emitter 120 in the backlight unit X shown in FIG. 19.

With reference to FIGS. 18 to 20, a process of forming the light emitter 120 according to an embodiment of the present disclosure will be described.

The light source board 200 may include a metal layer 201. The metal layer 201 may have an aluminum material.

The light source board 200 may include a copper foil layer 202 positioned on the metal layer 201. The light source board 200 may include the copper foil layer 202 positioned in front of the metal layer 201.

The current flowing in the light source board 200 may flow along the copper foil layer 202.

The light source board 200 may include an insulating layer 203 positioned on the copper layer. The light source board 200 may include the insulating layer 203 positioned in front of the copper foil layer 202.

The insulating layer 203 may prevent the current flowing along the copper foil layer 202 from escaping to the outside. The insulating layer 203 may cover the copper foil layer 202 to protect the copper foil layer 202.

A light source hole 203H communicating with the copper foil layer 202 may be arranged at a position corresponding to a position where the light source 110 is mounted on the insulating layer 203.

The light source 110 may be received in the light source hole 203H. The light source 110 may be received in the light source hole 203H and may be in contact with the copper foil layer 202. Accordingly, the light source 110 may be supplied with power.

A first mask 910a may be arranged in the vicinity of the light source board 200. The first mask 910a may be configured to define a light emitter hole 910aH at a position where the light emitter 120 is to be arranged.

In other words, the first mask 910a may be arranged to cover the light source board 200. In some embodiments, the light source board 200 and the first mask 910a may be arranged to be spaced apart from each other.

A first brush 920a with a first ink 930a for forming the light emitter 120 may be swept over the first mask 910a.

As the first brush 920a is swept over the first mask 910a, the first ink 930a may enter the light emitter hole 910aH defined on the first mask 910a. As a result, the light emitter 120 may be formed.

In other words, the method of forming the light emitter 120 may include a silkscreen printing method.

Figure 21:
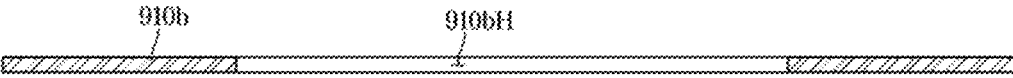
FIG. 21 is a conceptual view illustrating a portion of a process of forming a sound-absorbing layer on the backlight unit shown in FIG. 19.
Figure 21:
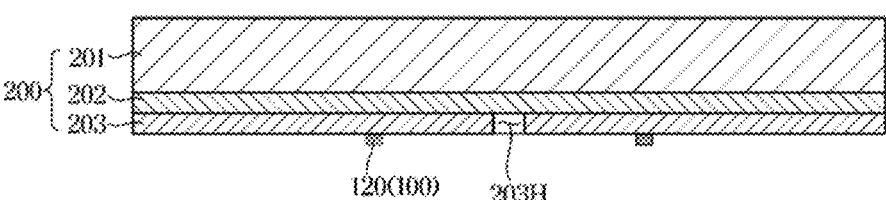
Figure 22:
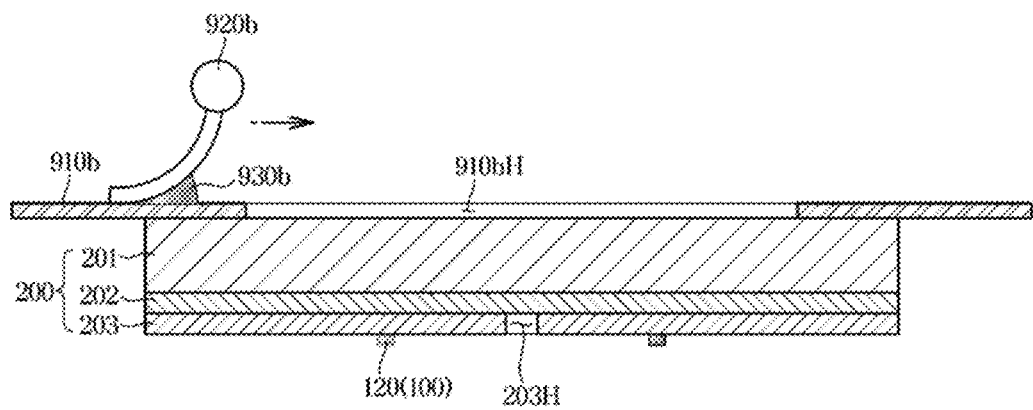
FIG. 22 is a conceptual view illustrating a portion of the process of forming the sound-absorbing layer on the backlight unit shown in FIG. 21.
Figure 23:
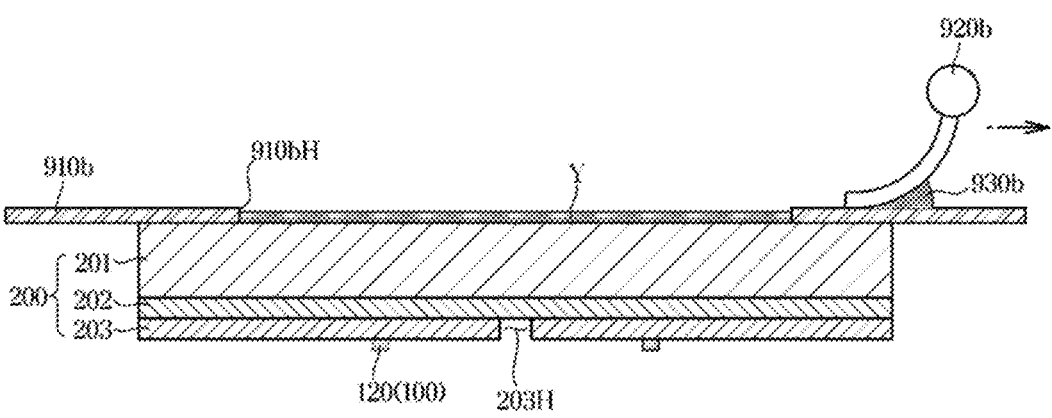
FIG. 23 is a conceptual view illustrating a portion of the process of forming the sound-absorbing layer on the backlight unit shown in FIG. 22.

FIG. 21 is a conceptual view showing a portion of a process of forming the sound-absorbing layer Y in the backlight unit X shown in FIG. 19. FIG. 22 is a conceptual view showing a portion of the process of forming the sound-absorbing layer Y in the backlight unit X shown in FIG. 21. FIG. 23 is a conceptual view showing a portion of the process of forming the sound-absorbing layer Y in the backlight unit X shown in FIG. 22.

With reference to FIGS. 21 to 23, a process of forming the sound-absorbing layer Y according to an embodiment of the present disclosure will be described.

The light source board 200 that has previously undergone the process of forming the light emitter 120 may be flipped and positioned to undergo the process on a rear surface of the light source board 200.

A second mask 910b may be positioned on the rear surface of the light source board 200. The second mask 910b may be configured to define a sound-absorbing layer hole 910bH at a position where the sound-absorbing layer Y is to be arranged.

In other words, the second mask 910b may be arranged to cover the light source board 200. In some embodiments, the light source board 200 and the second mask 910b may be arranged to be spaced apart from each other.

A second brush 920b impregnated with a second ink 930b may be swept over the second mask 910b.

As the second brush 920b is swept over the second mask 910b, the second ink 930b may enter the sound-absorbing layer hole 910bH defined on the second mask 910b. As a result, the sound-absorbing layer Y may be formed.

In this case, the first brush 920a and the second brush 920b may be the same. By not using a plurality of brushes, the cost of performing the production process may be reduced.

In this case, the second ink 930b may be the same as the first ink 930a. However, the present disclosure is not limited thereto, and the second ink 930b may have a different detail material from the first ink 930a. For example, since the first ink 930a is for the function of the light emitter 120, it may have a dye that produces a particular color. Since the second ink 930b is not an ink for the function of the light emitter 120, it may include a black dye to reduce cost.

In other words, the method of forming the sound-absorbing layer Y may include a silkscreen printing method. The sound-absorbing layer Y may be attached to the light source board 200 by a silkscreen printing method.

The method of forming the sound-absorbing layer Y may be similar to the method of forming the light emitter 120. The method of forming the sound-absorbing layer Y may be the same as the method of forming the light emitter 120, except that the second mask 910b is used instead of the first mask 910a.

Figure 24:
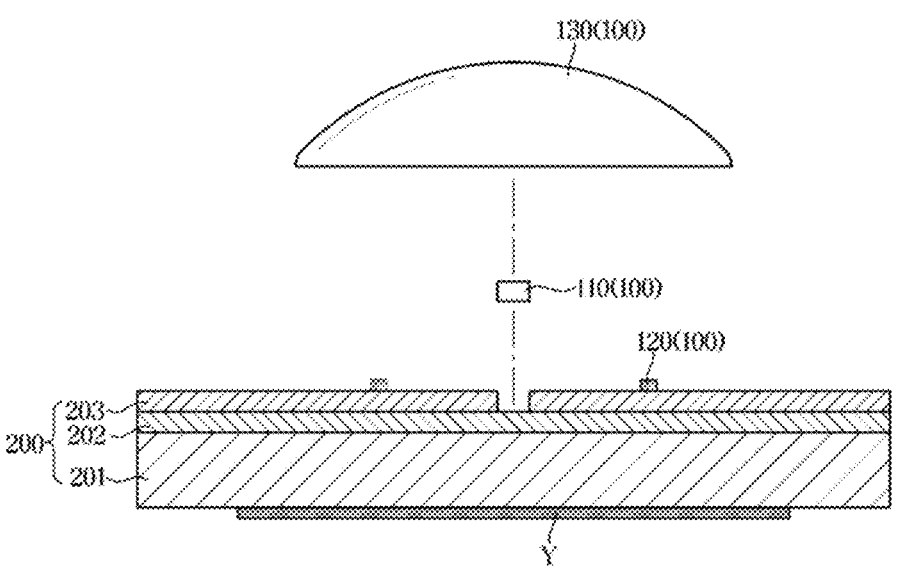
FIG. 24 is a conceptual view illustrating a process of forming a light source module on the backlight unit shown in FIG. 23.

FIG. 24 is a conceptual view showing a process of forming the light source module 100 on the backlight unit X shown in FIG. 23.

With reference to FIG. 24, a process for producing the backlight unit X according to an embodiment of the present disclosure will be described.

The light source board 200 that has previously undergone the process of forming the sound-absorbing layer Y may be flipped and positioned again to undergo the process on the front surface of the light source board 200.

The light source 110 may be positioned on the front surface of the light source board 200. The lens 130 may be positioned on the front surface of the light source board 200 to cover the light source 110 and the light emitter 120.

The display apparatus 1 or the backlight unit X according to an embodiment of the present disclosure has been described above. The display apparatus 1 or the backlight unit X according to another embodiment of the present disclosure will be described below. In describing another embodiment, configurations identical to those described with reference to FIGS. 1 to 24 will be given the same reference numerals and the description thereof will be omitted.

Figure 25:
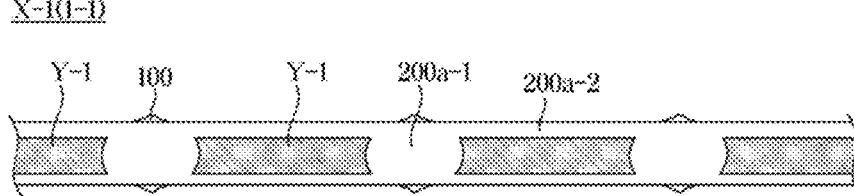
FIG. 25 is a rear view of a backlight unit according to an embodiment of the present disclosure.

FIG. 25 is a rear view of a backlight unit X-1 according to an embodiment of the present disclosure.

With reference to FIG. 25, a sound-absorbing layer Y-1 according to another embodiment of the present disclosure will be described.

The backlight unit X-1 may include the sound-absorbing layer Y-1.

The sound-absorbing layer Y-1 may be positioned on the rear surface of the light source board 200.

The absorbing layers Y-1 may be provided in a plurality.

The plurality of sound-absorbing layers Y-1 may be arranged along the extension direction of the light source board 200.

The plurality of sound-absorbing layers Y-1 may be positioned to be spaced apart from a portion of the light source board 200 corresponding to the position of the light source 110 or the light source module 100. Accordingly, only the light source board 200 and the rear chassis 300 may be positioned at the rear side of the light source 110 or the light source module 100, and thus heat from the light source 110 to the rear chassis 300 may be well dissipated.

The light source board 200 may include a first portion 200a-1 to which the plurality of light sources 110 are attached, and a second portion 200b-1 positioned between the plurality of light sources 110. The sound-absorbing layer Y-1 may be attached to the second portion 200b-1.

Figure 26:
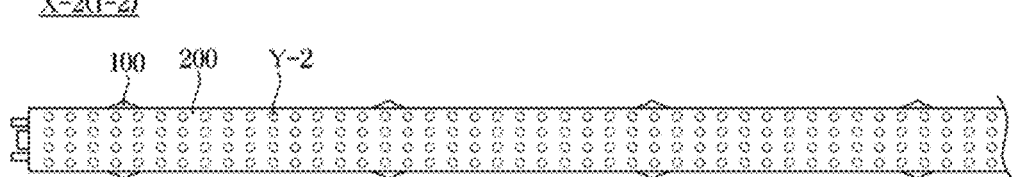
FIG. 26 is a rear view of a backlight unit according to an embodiment of the present disclosure.

FIG. 26 is a rear view of a backlight unit X-2 according to an embodiment of the present disclosure.

With reference to FIG. 26, a sound absorbing layer Y-2 according to another embodiment of the present disclosure will be described.

The backlight unit X-2 may include the absorbing layer Y-2.

The sound-absorbing layer Y-2 may be positioned on the rear surface of the light source board 200.

The sound-absorbing layers Y-2 may be provided in a plurality. The plurality of sound-absorbing layers Y-2 may be arranged along the extension direction and the height direction of the light source board 200. The sound-absorbing layers Y-2 may be arranged in a matrix arrangement.

The plurality of sound-absorbing layers Y-2 may be patterned and attached to the light source board 200.

The sound-absorbing layers Y-2 may have the shape of a dot.

Thereby, a sound-absorbing effect may be achieved with a small amount of the sound-absorbing layers Y-2.

Figure 27:
FIG. 27 is a rear view of a backlight unit according to an embodiment of the present disclosure.

FIG. 27 is a rear view of a backlight unit X-3 according to an embodiment of the present disclosure.

With reference to FIG. 27, a sound-absorbing layer Y-3 according to still another embodiment of the present disclosure will be described.

The backlight unit X-3 may include the sound-absorbing layer Y-3.

The sound-absorbing layer Y-3 may be positioned on the rear surface of the light source board 200.

The sound-absorbing layers Y-3 may be provided in a plurality. The plurality of sound-absorbing layers Y-3 may extend along the extension direction of the light source board 200.

The plurality of sound-absorbing layers Y-3 may be arranged along the height direction of the light source board 200.

The sound-absorbing layer Y-3 may have a straight shape.

Figure 28:
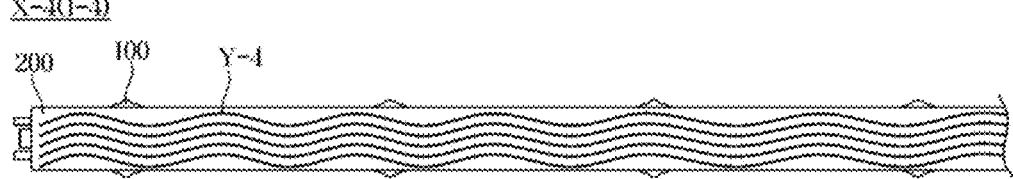
FIG. 28 is a rear view of a backlight unit according to an embodiment of the present disclosure.

FIG. 28 is a rear view of a backlight unit X-4 according to an embodiment of the present disclosure.

With reference to FIG. 28, a sound-absorbing layer Y-4 according to still another embodiment of the present disclosure will be described.

The backlight unit X-4 may include the sound-absorbing layer Y-4.

The sound-absorbing layer Y-4 may be positioned on the rear surface of the light source board 200.

The sound-absorbing layers Y-4 may be provided in a plurality. The plurality of sound-absorbing layers Y-4 may extend along the extension direction of the light source board 200.

The plurality of sound-absorbing layers Y-4 may be arranged along the height direction of the light source board 200.

The sound-absorbing layers Y-4 may have a zigzag shape in the vertical direction.

Figure 29:
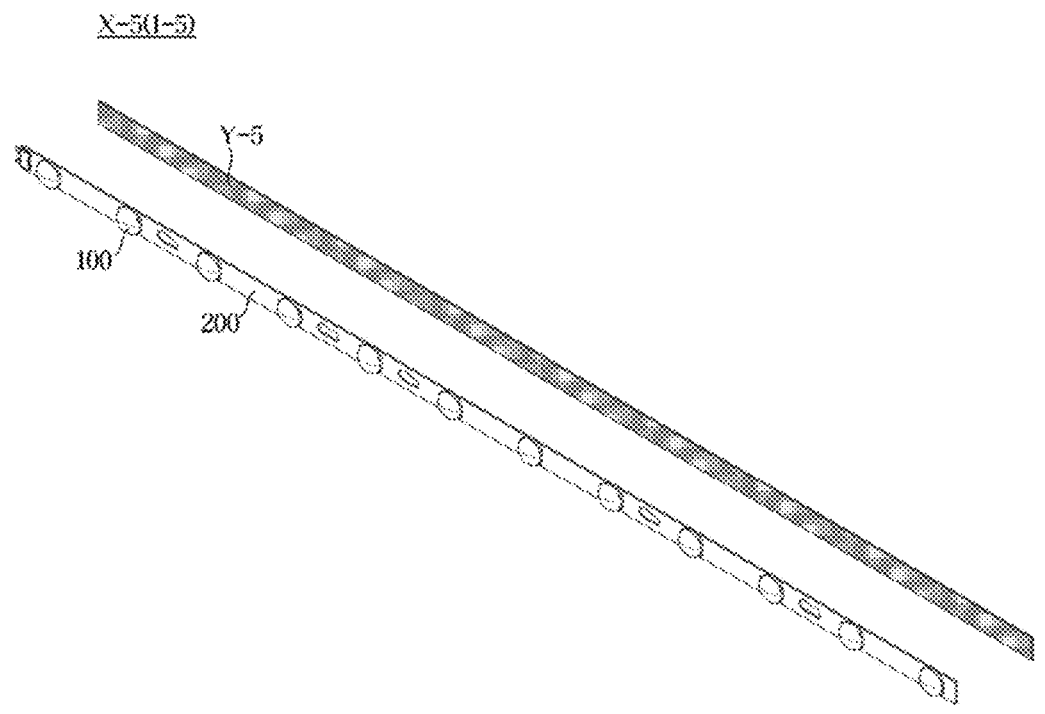
FIG. 29 is a perspective view illustrating a portion of a display apparatus according to an embodiment of the present disclosure.

FIG. 29 is a perspective view showing a portion of a display apparatus 1-5 according to an embodiment of the present disclosure.

With reference to FIG. 29, a sound-absorbing layer Y-5 according to still another embodiment of the present disclosure will be described.

A backlight unit X-5 may include the sound-absorbing layer Y-5 configured to be separated from the light source board 200.

Since the sound-absorbing layer Y-5 is produced separately from the backlight unit X-5, the production time may be increased compared to the embodiments described with reference to FIGS. 1 to 24.

The sound-absorbing layer Y-5 in the present embodiment of the present disclosure may be thicker than the sound-absorbing layer Y in the embodiments described with reference to FIGS. 1 to 24. The thicker the sound-absorbing layer Y-5 becomes, the better the sound-proofing effect may be.

The sound-absorbing layer Y-5 of the present disclosure may include a rubber material.

The sound-absorbing layer Y-5 may be positioned between the light source board 200 and the rear chassis 300 to prevent the light source board 200 from contacting the rear chassis 300.

Figure 30:
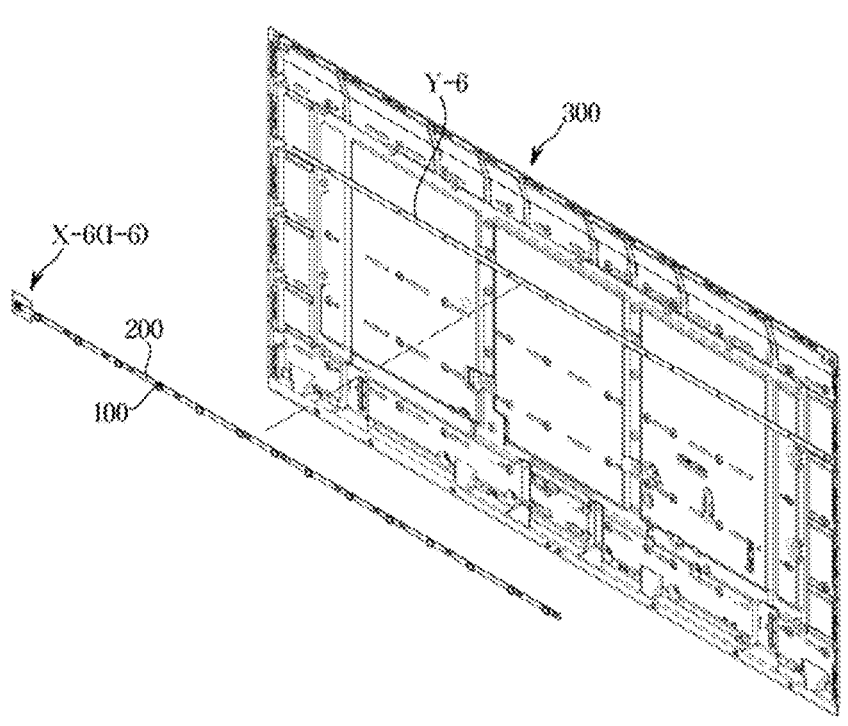
FIG. 30 is a perspective view illustrating a portion of a display apparatus according to an embodiment of the present disclosure.

FIG. 30 is a perspective view showing a portion of a display apparatus 1-6 according to an embodiment of the present disclosure.

With reference to FIG. 30, a sound-absorbing layer Y-6 according to still another embodiment of the present disclosure will be described.

A backlight unit X-6 may include the sound-absorbing layer Y-6 configured to be separated from the light source board 200.

The sound-absorbing layer Y-6 may be configured to be coupled to the rear chassis 300.

In this case, the rear chassis 300 and the sound-absorbing layer Y-6 may be formed integrally. Thus, the coupling time between the rear chassis 300 and the light source board 200 may be shortened.

At the same time, the thickness of the sound-absorbing layer Y-6 may also be increased.

The sound-absorbing layer Y-6 may have a hole through which the coupling protrusion 320 may penetrate.

Although certain exemplary embodiments are illustrated and described above, the present disclosure is not limited to the certain embodiments, various applications may of course be performed by those skilled in the art without deviating from what is claimed in the scope of claims, and such applications should not be understood separately from the technical idea or prospects herein.

The invention claimed is:

1. A display apparatus comprising:
a display panel;
a rear chassis configured to support the display panel; and
a light source module positioned on the rear chassis,
wherein the light source module comprises:
   a light source configured to emit light periodically by power of a power source periodically applied so as to adjust an intensity of the light,
   a light source board electrically connectable with the light source, the light source board configured to be periodically moved at least partially closer to the rear chassis based on the power of the power source periodically applied to the light source, and
   a sound-absorbing layer positioned on the light source board and configured to be moved in and out of contact with the rear chassis with movement of the light source board so as to reduce noise caused by the light source board and the rear chassis.

2. The display apparatus of claim 1, wherein the sound-absorbing layer is positioned between the light source board and the rear chassis.

3. The display apparatus of claim 2, wherein the sound-absorbing layer is configured to be attached to the light source board.

4. The display apparatus of claim 2, wherein the light source board comprises:
a plurality of coupling portions configured to be coupled with the rear chassis, and
a vibrating portion arranged between the plurality of coupling portions to allow a distance from the rear chassis to be variable.

5. The display apparatus of claim 4, wherein
the light source board extends in a longitudinal direction, and
the plurality of coupling portions are arranged in the longitudinal direction.

6. The display apparatus of claim 5, wherein a length of the light source board is 200 times or more than a thickness of the light source board.

7. The display apparatus of claim 4, wherein
the coupling portion of the light source board comprises a coupling hole,
the rear chassis comprises a coupling protrusion configured to penetrate the coupling hole and couple the rear chassis and the light source board, and
the sound-absorbing layer is coupled to the vibrating portion of the light source board to prevent shielding of the coupling hole.

8. The display apparatus of claim 1, wherein
the light source module comprises a light emitter configured to convert a wavelength of light emitted from the light source into a plurality of different wavelengths, and
the sound-absorbing layer comprises a first material and the light emitter comprises a second material, wherein the first and the second materials are same.

9. The display apparatus of claim 1, wherein the sound-absorbing layer is configured to cover a portion of a surface of the light source board facing the rear chassis.

10. The display apparatus of claim 1, wherein the periodically applied power has a frequency of 500 Hz or higher.

11. The display apparatus of claim 10, wherein
the rear chassis comprises a metallic material, and
the light source board comprises a metallic material so as to generate metal friction noise in response to contact with the rear chassis.

12. The display apparatus of claim 1, wherein the sound-absorbing layer comprises an epoxy material.

13. The display apparatus of claim 12, wherein the sound-absorbing layer has a thickness of 50 μm or less.

14. The display apparatus of claim 1, further comprising a power board configured to periodically turn on or off the power applied to the light source.

15. The display apparatus of claim 1, wherein the sound-absorbing layer is attached to the light source board by a silkscreen printing method.

* * * * *